United States Patent
Kawano

(10) Patent No.: US 6,290,266 B1
(45) Date of Patent: Sep. 18, 2001

(54) SUCTION ELBOW PROVIDED WITH BUILT-IN GUIDE BLADES

(76) Inventor: Michihiko Kawano, 1-6-203, Tani 1-chome, Chuo-ku, Fukuoka-shi, Fukuoka-ken, 810-0031 (JP)

( * ) Notice: Subject to any disclaimer, the term of this patent is extended or adjusted under 35 U.S.C. 154(b) by 0 days.

(21) Appl. No.: 09/308,178

(22) PCT Filed: Sep. 17, 1998

(86) PCT No.: PCT/JP98/04185

§ 371 Date: May 14, 1999

§ 102(e) Date: May 14, 1999

(87) PCT Pub. No.: WO99/15795

PCT Pub. Date: Apr. 1, 1999

(30) Foreign Application Priority Data

Sep. 22, 1997 (JP) .................................................... 9-255860
Apr. 21, 1998 (JP) .................................................... 10-110493

(51) Int. Cl.[7] ......................................................... F16L 41/00
(52) U.S. Cl. ........................ 285/156; 285/176; 285/179; 138/39; 406/191; 406/195
(58) Field of Search .................................... 285/156, 176, 285/179–181, 183; 138/39; 406/191, 195

(56) References Cited

U.S. PATENT DOCUMENTS

| | | | |
|---|---|---|---|
| 2,216,046 | * | 9/1940 | Peck ..................................... 285/179 |
| 4,209,192 | * | 6/1980 | Knight ................................. 285/181 |
| 4,919,170 | * | 4/1990 | Kallinich et al. ...................... 138/39 |
| 4,974,881 | * | 12/1990 | Engel et al. .......................... 285/181 |

FOREIGN PATENT DOCUMENTS

| | | | |
|---|---|---|---|
| 742475 | * | 10/1943 | (DE) ...................................... 138/39 |
| 0 667 460 | | 8/1995 | (EP) . |
| 442186 | * | 2/1936 | (GB) ...................................... 138/39 |
| 700615 | | 12/1953 | (GB) . |
| 46-83 | | 7/1971 | (JP) . |
| 61-97690 | | 6/1986 | (JP) . |
| 1-112354 | | 7/1989 | (JP) . |
| 6-85905 | | 12/1994 | (JP) . |
| 7-269524 | | 10/1995 | (JP) . |

\* cited by examiner

*Primary Examiner*—Teri Pham Luu
(74) *Attorney, Agent, or Firm*—Griffin & Szipl, P.C.

(57) ABSTRACT

A suction elbow is divided in a plurality of sub-channels similar to each other by one or more guide vanes made of a curved plate and flat plates connected to the curved plate based on the following formulas.

$$p_0 = h/\{[f/(f-r)]^m - 1\} \quad (1)$$

$$a_n = p_0 r[f/(f-r)]^n \quad (2)$$

$$b_n = a_n/f \quad (3)$$

$p_0$: overhang length at the inlet of the elbow
h: outlet breadth of the elbow
f: reduction ratio of the elbow (f=W/h)
W: inlet breadth of the elbow
m: number of sub-channels (m≥2)
$a_n$: inlet breadth of n-th sub-channel ($a_0$ indicates the radius of curvature of the inner side wall and $a_m$ indicates the radius of curvature of the outer side wall)
r: aspect ratio of the sub-channels
$b_n$: outlet breadth of n-th sub-channel

11 Claims, 21 Drawing Sheets

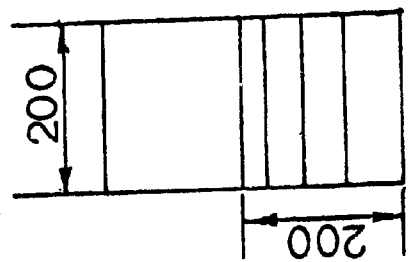
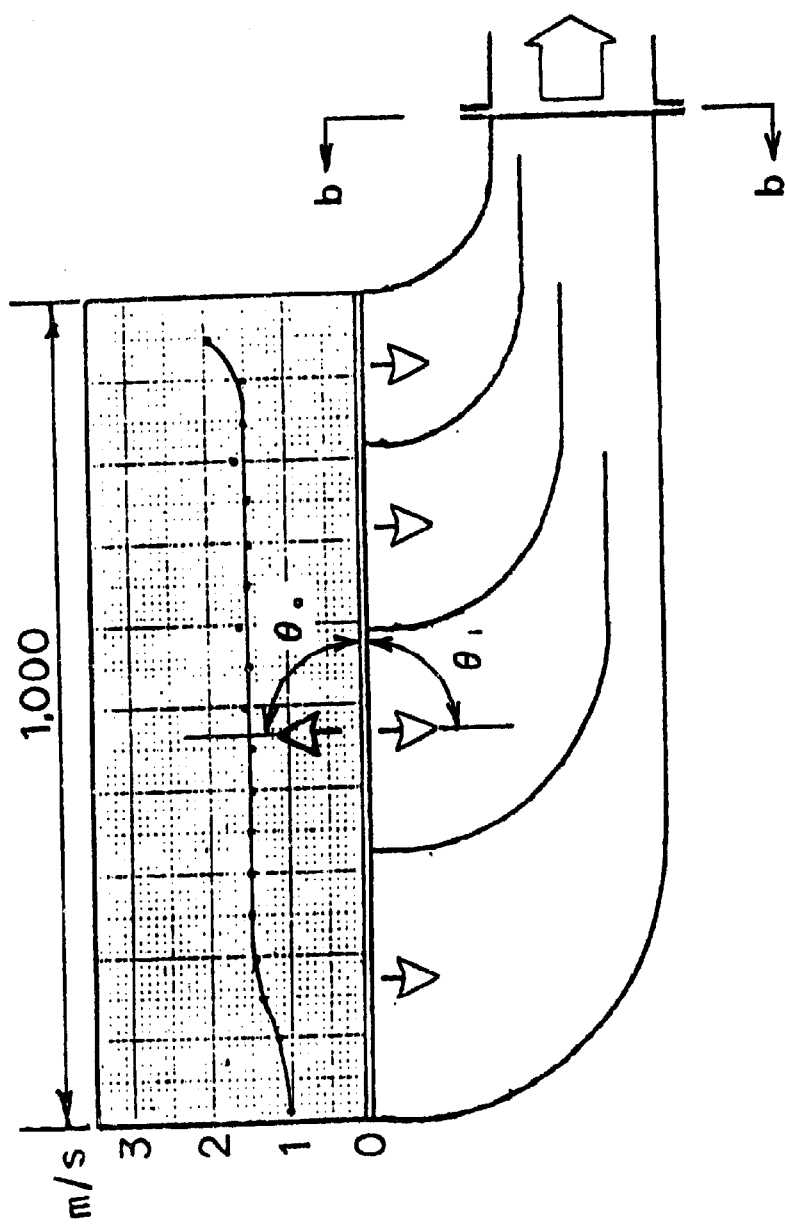
Fig. 2 (a)
Fig. 2 (b)

Fig. 3

| No. | Kind of elbow | Specifications of elbow ||||| Test data ||||||||
|---|---|---|---|---|---|---|---|---|---|---|---|---|---|
| | | Reduction ratio f | Expansion ratio f | Number of sub-channels m | Aspect ratio r | Inlet |||| Outlet |||| Pressure loss | Pressure loss coefficient |
| | | | | | | Static pressure mmAq | Velocity m/s | Dynamic pressure mmAq | Static pressure mmAq | Velocity m/s | Dynamic pressure mmAq | mmAq | k |
| 1 | Suction elbow | 5 | — | 4 | 0.88 | 0 | 1.5 | 0.14 | −2.0 | 7.5 | 3.2 | 1.06 | 0.33 |
| 2 | Blowout elbow | — | 5 | 4 | 0.88 | −1.0 | 8.0 | 3.9 | 0 | 1.6 | 0.16 | 2.74 | 0.70 |

Note: mmAq = mm water column f = 1 f = 3 f = 5

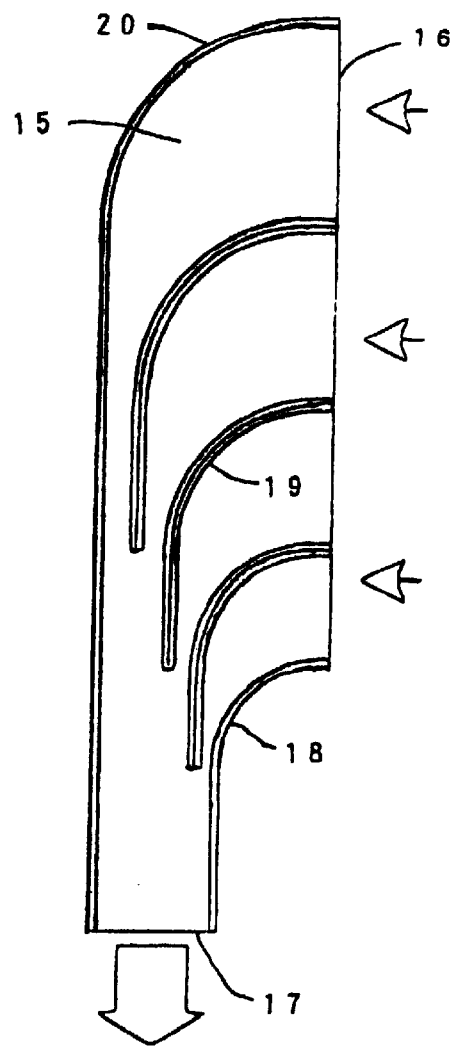
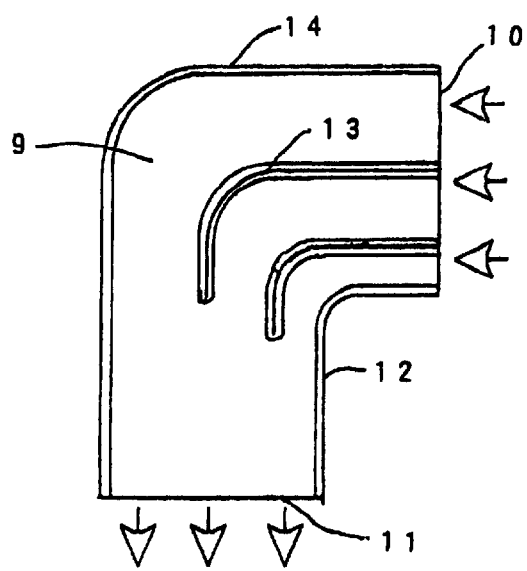

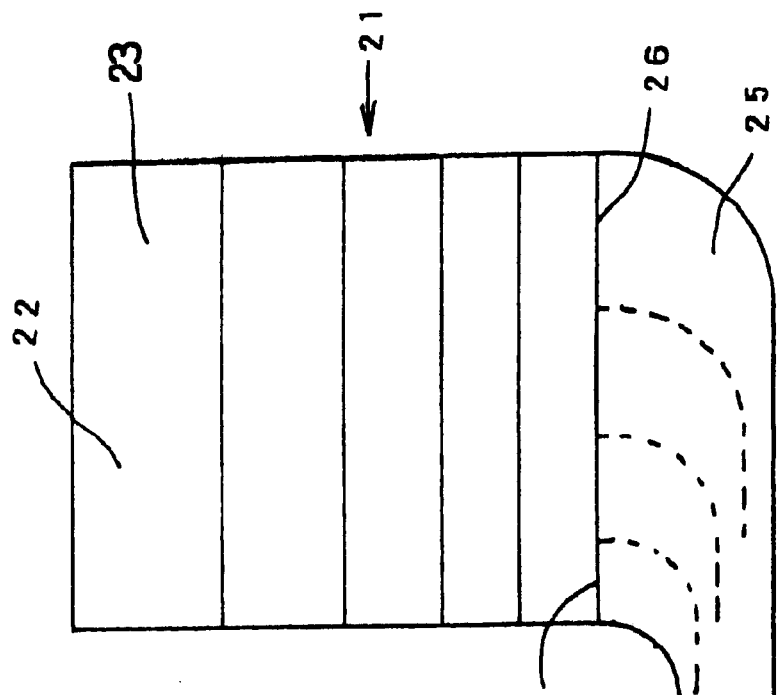
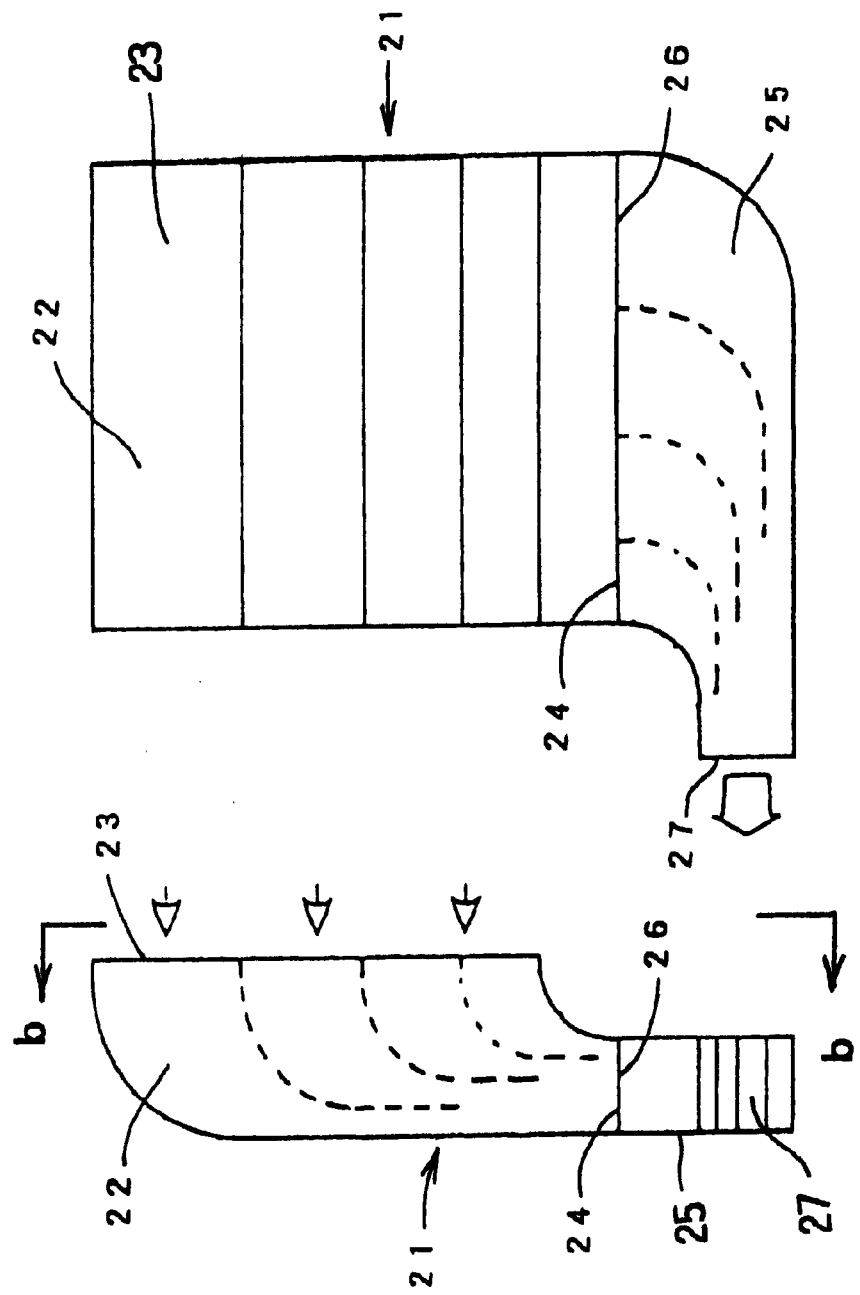
Fig. 6 (a)
Fig. 6 (b)

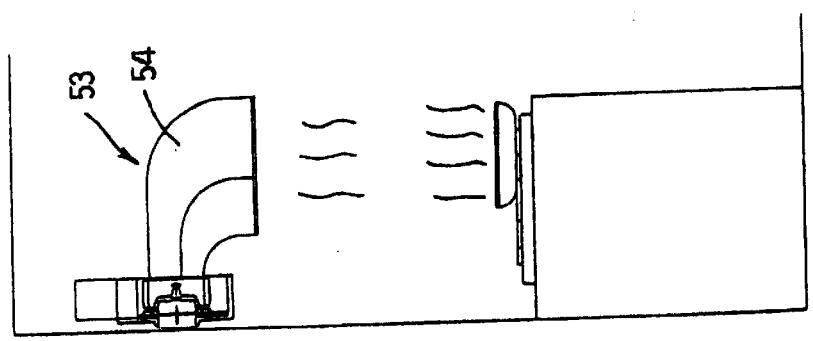
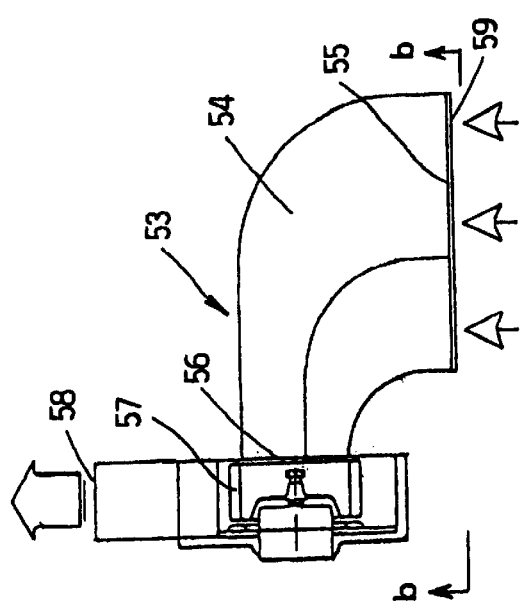
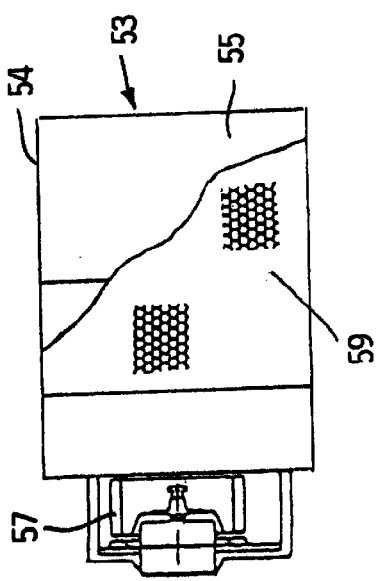

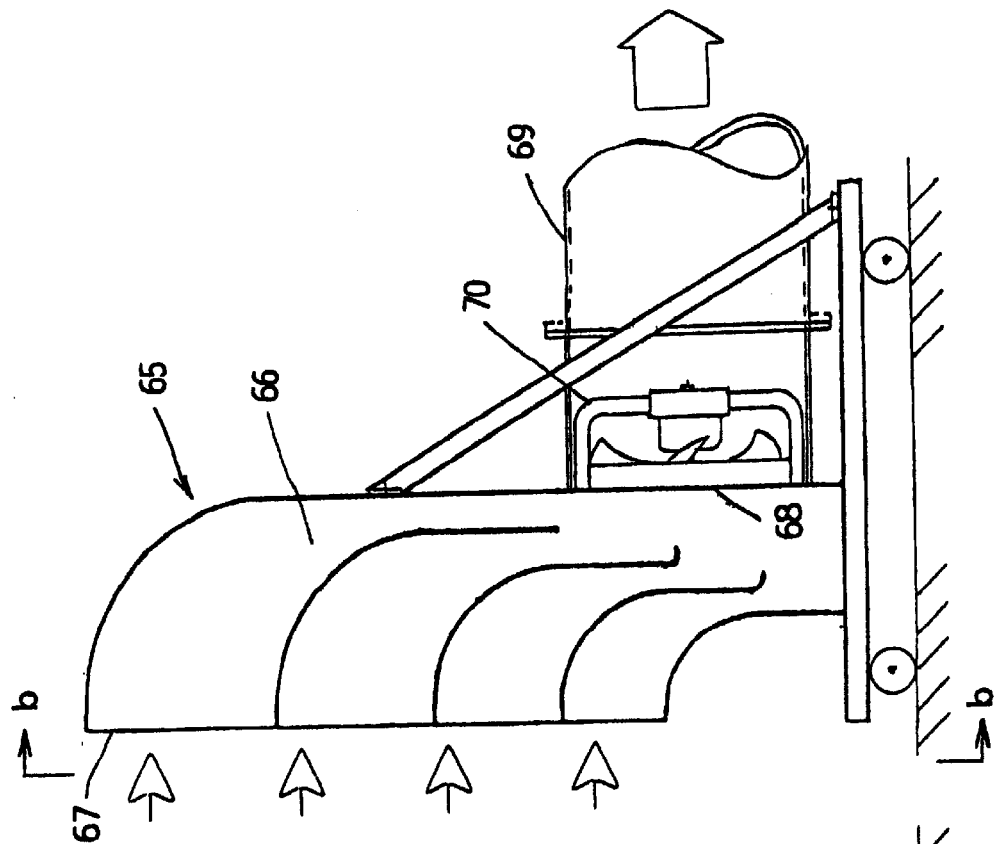
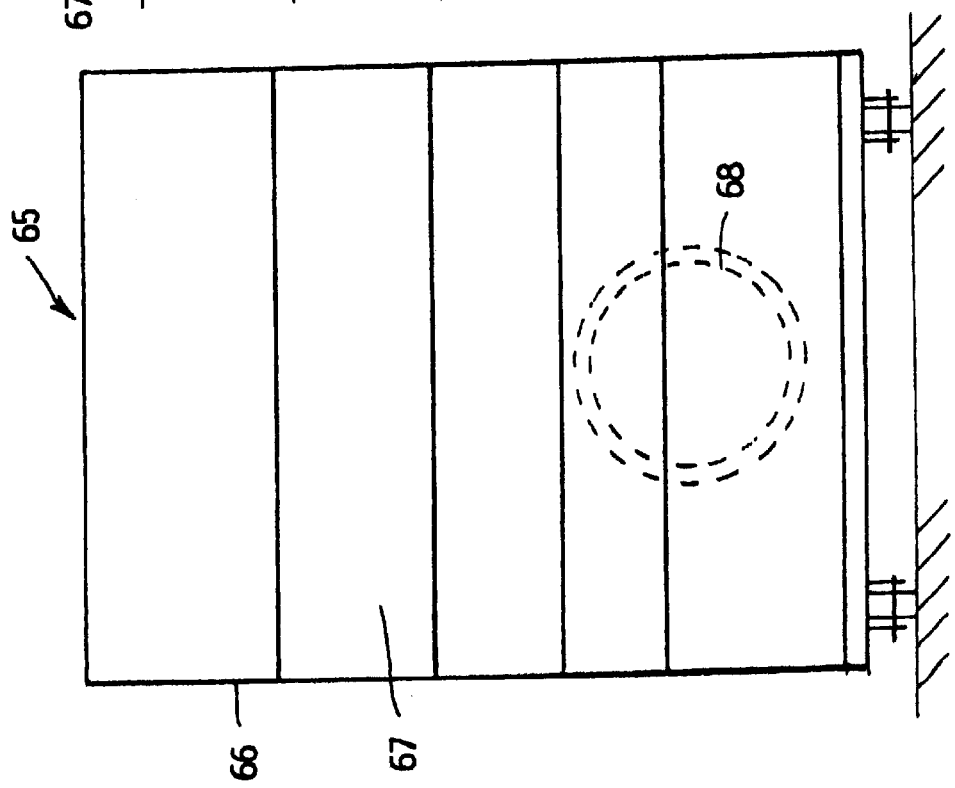
Fig. 13 (a)
Fig. 13 (b)

US 6,290,266 B1

SUCTION ELBOW PROVIDED WITH BUILT-IN GUIDE BLADES

TECHNICAL FIELD

The present invention relates to a suction elbow provided with guide vanes to be disposed in an inlet port of a pipe line, a duct, a range hood, a canopy hood, a suction floor of a clean room, etc.

BACKGROUND ART

A various kinds of measures such as the installation of a flow resistor such as a perforated panel, a baffle plate, etc., the installation of a large number of inlet ports, the installation of a large volume of suction space under the floor, etc. have been taken in order to achieve a uniform distribution of sucked fluid velocity at an inlet port.

Those conventional measures can not actually achieve uniform distribution of sucked fluid velocity and have problems such as increase of pressure loss, increase of equipment cost, etc.

DISCLOSURE OF INVENTION

An object of the present invention is to provide a suction elbow which can achieve uniform distribution of sucked fluid velocity, small pressure loss, simple structure and no increase of equipment cost, and can be equally applied to expansion, normal, and reduction elbows.

According to the present invention, there is provided a suction elbow provided with guide vanes, wherein one or more guide vanes made of a curved plate and flat plates connected to the curved plate are disposed to make the shapes of the sub-channels defined thereby similar to each other based on the following formulas.

$$p_0 = h / \{[f/(f-r)]^m - 1\} \qquad ①$$

$$a_n = p_0 [f/(f-r)]^n \qquad ②$$

$$b_n = a_n / f \qquad ③$$

$p_0$: overhang length at the inlet of the elbow
h: outlet breadth of the elbow
f: reduction ratio of the elbow (f=W/h)
W: inlet breadth of the elbow
m: number of sub-channels (m≧2)
$a_n$: inlet breadth of n-th sub-channel ($a_0$ indicates the radius of curvature of the inner side wall and $a_m$ indicates the radius of curvature of the outer side wall)
r: aspect ratio of the sub-channels
$b_n$: outlet breadth of n-th sub-channel Derivation of formulas ① to ③ will be described based on FIG. 1.

In FIG. 1, reference numeral 1 indicates a base elbow $B_1 E_2 B_5 E_1$, 2 indicates the outlet of the elbow, 3 indicates the inlet of the elbow, 4 indicates the inner side wall of the elbow, 5, 6 and 7 indicate No. 1 guide vane, No. 2 guide vane and No. 3 guide vane, and 8 indicates the outer side wall of the elbow. Reference letter W indicates inlet breadth of the elbow, and reference letter h indicates outlet breadth of the elbow.

The sub-channels defined in the elbow are similar to each other. Thus, the reduction ratio f of the elbow is expressed as follows.

$$f = W/h = (a_1+a_2+a_3+\ldots)/(b_1+b_2+b_3+\ldots) = a_1/b_1 = a_2/b_2 = a_3/b_3 = \ldots = a_n/b_n$$

The rectangle lengths $p_n$ of the sub-channels are expressed as follows.

$$p_1 = p_0 + b_1, \; p_2 = p_0 + b_1 + b_2, \; p_3 = p_0 + b_1 + b_2 + b_3, \ldots$$

$$p_n = p_0 + b_1 + b_2 + b_3 + \ldots + b_n$$

The aspect ratio r of the sub-channels is expressed as follows.

$$r = a_0/p_0 = a_1/p_1 = a_2/p_2 = a_3/p_3 = \ldots = a_n/p_n$$

From the above equations, the formulas ① to ③ are derived for obtaining the overhang length $p_0$ at the inlet of the elbow, the inlet breadth $a_n$ of n-th sub-channel, and the outlet breadth $b_n$ of n-th sub-channel based on given values of the outlet breadth h, the inlet breadth W, the number of sub-channels m and the aspect ratio r of the sub-channels.

Configurations of the guide vanes 5 to 7, the inner side wall 4 of the elbow and the outer side wall 8 of the elbow can be determined based on the formulas ① to ③ as follows.

Based on the overhang length $p_0$ at the inlet of the elbow, the inlet breadth $a_n$ of n-th sub-channel, and the outlet breadth $b_n$ of n-th sub-channel, which are obtained from the formulas ① to ③, rectangles $A_0 A_1 B_1 C_0$, $A_1 A_2 B_2 C_1$, $A_2 A_3 B_3 C_2$, $A_3 A_4 B_4 C_3$ and $A_4 A_5 B_5 C_4$ are determined, as shown in FIG. 1. Circular arcs $R_0$, $R_1$, $R_2$, $R_3$ and $R_4$ which respectively touch internally the above rectangles are determined. Circular arcs are determined as follows. $R_0 = a_0$, $R_1 = a_1$, $R_2 = a_2$, $R_3 = a_3$ and $R_4 = a_4$.

The line $B_2 C_1$ is extended by a length equal to that of the line $B_1 C_0$ so as to determine a line $C_1 D_0$. The line $B_3 C_2$ is extended by a length equal to that of the line $B_2 C_1$ so as to determine a line $C_2 D_1$. The line $B_4 C_3$ is extended by a length equal to that of the line $B_3 C_2$ so as to determine a line $C_3 D_2$. The line $B_1 C_0$ is extended by an appropriate length so as to determine a line $C_0 F_1$. The line $B_5 E_1$ is extended by a length equal to that of the line $B_1 F_1$ so as to determine a line $E_1 F_2$.

Thus, No. 1 guide vane 5 ($D_0 C_1 A_2$), No. 2 guide vane 6 ($D_1 C_2 A_3$), No. 3 guide vane 7 ($D_2 C_3 A_4$), inner side wall 4 ($F_1 C_0 A_1$) and outer side wall 8 ($F_2 C_4 A_5$) are determined. As a result, there is obtained a suction elbow provided with guide vanes which is divided by No. 1 guide vane 5 ($D_0 C_1 A_2$), No. 2 guide vane 6 ($D_1 C_2 A_3$) and No. 3 guide vane 7 ($D_2 C_3 A_4$) into sub-channels $C_0 A_1 A_2 D_0$, $C_1 A_2 A_3 D_1$, $C_2 A_3 A_4 D_2$ and $C_3 A_4 A_5 D_3$ that are similar to each other.

A reduction elbow is obtained when the reduction ratio f is f>1, a normal elbow is obtained when the reduction ratio f is f=1 and an expansion elbow is obtained when the reduction ratio f is f<1. Usually, a reduction elbow or a normal elbow is used as a suction elbow.

In a bent duct such as an elbow, flow of sucked fluid becomes a free vortex flow. In a free vortex flow, RV=constant (R: radius of flow, V: flow velocity). Thus, the velocity of sucked fluid at the inlet of an elbow increases from the outer side wall to the inner side wall. In the present invention, a suction elbow is divided into a plurality of similarly shaped sub-channels which decrease in size from the sub-channel near the outer side wall of the elbow toward the sub-channel near the inner side wall of the elbow. Thus, the ratio of the side wall length of the sub-channel to the sectional area of the sub-channel increases from that in the sub-channel near the outer side wall of the elbow toward that in the sub-channel near the inner side wall of the elbow. The flow resistance in the sub-channels therefore increases from that in the sub-channel near the outer side wall of the elbow toward that in the sub-channel near the inner side wall of the elbow. Thus, the velocity distribution of a free vortex flow and the flow resistance distribution cancel each other to uniformize the velocity distribution of sucked fluid velocity over the whole width of the inlet of the suction elbow.

Usually, a suction elbow in accordance with the present invention is used as a reduction elbow or a normal elbow. No pressure loss due to a vortex flow is generated when a suction elbow provided with guide vanes in accordance with the present invention is used as a reduction elbow or a normal elbow because a vortex flow is generated in an expansion channel. Thus, a suction elbow in accordance with the present invention generates only a small pressure loss.

A suction elbow provided with guide vanes in accordance with the present invention has a simple structure and does not cause increase of equipment cost.

A suction elbow provided with guide vanes in accordance with the present invention can be applied to a reduction elbow, a normal elbow and an expansion elbow.

BRIEF DESCRIPTION OF DRAWINGS

In the drawings:

FIG. 2($a$) is said sectional view of a suction elbow provided with guide vanes in accordance with the present invention used for a performance test and a diagram showing the velocity distribution of sucked air obtained by the performance test and FIG. 2($b$) is a view looking in the direction of arrows b—b in FIG. 2($a$).

FIG. 3 is a table showing test conditions and test results.

FIG. 4($a$) is a side sectional view of a normal suction elbow wherein the number m of the sub-channels is m=3 and the reduction ratio f is f=1. FIG. 4($b$) is a side sectional view of a reduction suction elbow wherein the number m of the sub-channels is m=3 and the reduction ratio f is f=3. FIG. 4($c$) is a side sectional view of a reduction suction elbow wherein the number m of the sub-channels is m=4 and the reduction ratio f is f=5.

FIGS. 5($a$) and 5($b$) are structural views of noise absorbing suction elbows provided with guide vanes in accordance with the second embodiment of the present invention. FIG. 5($a$) is a side sectional view of a noise absorbing normal suction elbow wherein the number m of the sub-channels is m=3 and the reduction ratio f is f=1. FIG. 5($b$) is a side sectional view of a noise absorbing reduction suction elbow wherein the number m of the sub-channels is m=4 and the reduction ratio f is f=5.

FIGS. 6($a$) and 6($b$) are structural views of an L-shaped suction elbow provided with guide vanes in accordance with the third embodiment of the present invention. FIG. 6($a$) is a side view of the inlet of the elbow. FIG. 6($b$) is a view looking in the direction of the arrows b—b in FIG. 6($a$).

FIG. 7($a$) is a side sectional view. FIG. 7($b$) is a view looking in the direction of the arrows b—b in FIG. 7($a$).

FIG. 8($a$) is a side sectional view. FIG. 8($b$) is a view looking in the direction of the arrows b—b in FIG. 8($a$). FIG. 8($c$) is a view looking in the direction of the arrows c—c in FIG. 8($a$).

FIG. 9($a$) is a side sectional view. FIG. 9($b$) is a view looking in the direction of the arrows b—b in FIG. 9($a$).

FIG. 10($a$) is a side sectional view. FIG. 10($b$) is a view looking in the direction of the arrows b—b in FIG. 10($a$).

FIGS. 11($a$) to 11($c$) are structural views of an elbow-shaped range hood in accordance with the eighth embodiment of the present invention comprising a suction elbow provided with guide vanes in accordance with the present invention. FIG. 11($a$) is a side sectional view. FIG. 11($b$) is a view looking in the direction of the arrows b—b in FIG. 11($a$). FIG. 11($c$) is a side sectional view of the elbow-shaped range hood in operation.

FIG. 12($a$) is a front sectional view. FIG. 12($b$) is a view looking in the direction of the arrows b—b in FIG. 12($a$).

FIGS. 13($a$) and 13($b$) are structural views of a suction apparatus in accordance with the tenth embodiment of the present invention comprising a suction elbow provided with guide vanes in accordance with the present invention. FIG. 13($a$) is a side sectional view. FIG. 13($b$) is a view looking in the direction of the arrows b—b in FIG. 13($a$).

FIG. 16($a$) is a side sectional view. FIG. 16($b$) is a view looking in the direction of the arrows b—b in FIG. 16($a$).

FIG. 20(a) is a plan view without one of the air blowers. FIG. 20(b) is a view looking in the direction of the arrows b—b in FIG. 20(a).

FIG. 21(a) is a perspective view without a part of enclosing wall. FIG. 21(b) is a perspective view of a partial construction. FIG. 21(c) is a perspective view showing the air flow.

BEST MODE FOR CARRYING OUT THE INVENTION

Figure 1:
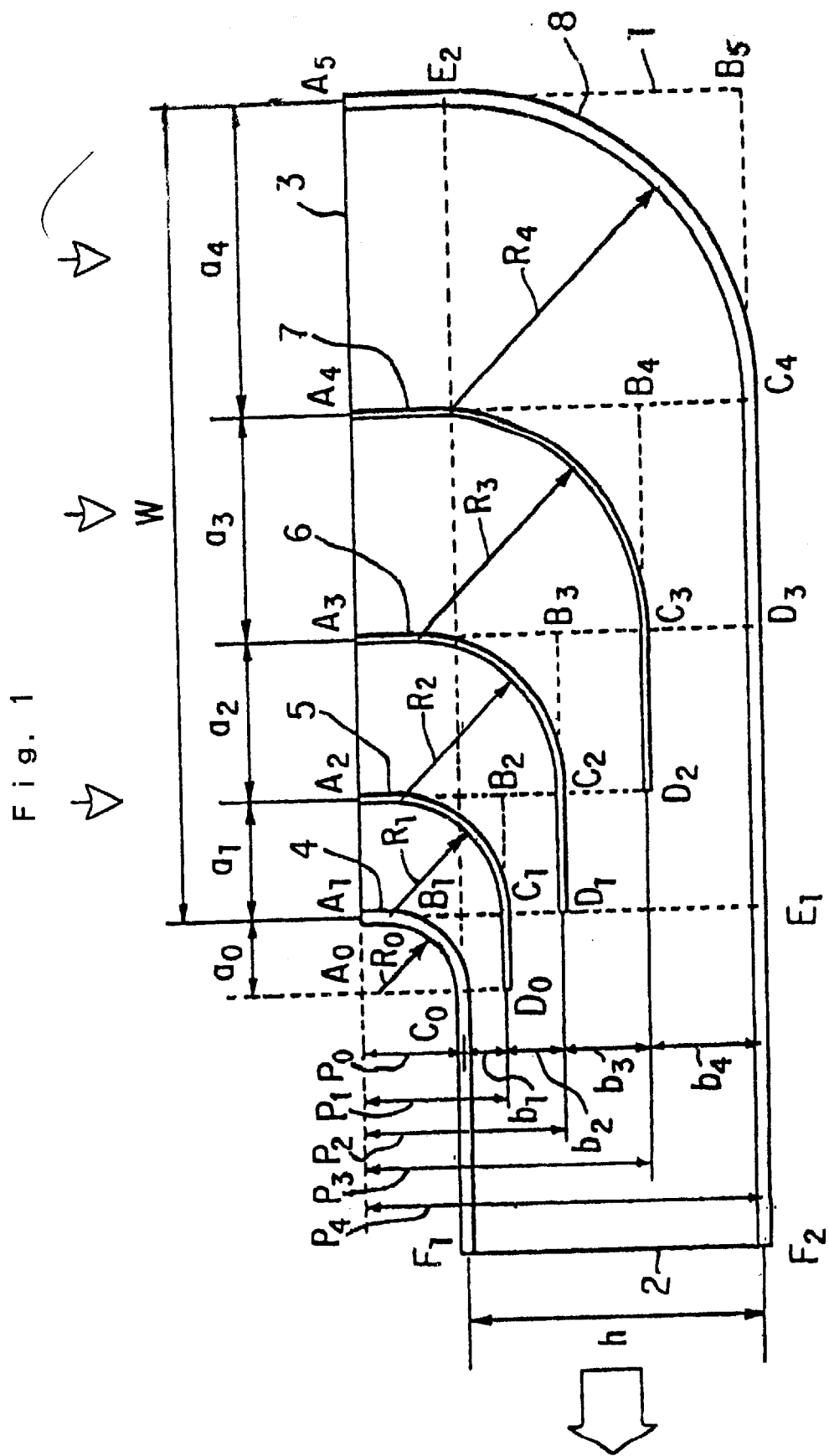
FIG. 1 is a side sectional view of a suction elbow provided with guide vanes for explaining the derivation of the design formulas of a suction elbow provided with guide vanes in accordance with the present invention.

[I] Performance Test of a Suction Elbow in Accordance with the Present Invention (1) Performance test A suction performance test of static room air was carried out on a square suction elbow provided with guide vanes made of galvanized steel plates in accordance with the present invention, wherein reduction ratio f was f=5, number of sub-channels m was m=4, aspect ratio of the sub-channels r was r=0.88, shape of the inlet=1,000 mm×200 mm rectangular and shape of the outlet=200 mm×200 mm square. The structure of the tested suction elbow provided with guide vanes is shown in FIG. 2. Specifications of the tested suction elbow provided with guide vanes are shown in FIG. 3.

(2) Test results

Measured velocity distribution of sucked air is shown in FIG. 2(a). Test results are shown in FIG. 3. Results of a blowout performance test carried out on a blowout elbow (expansion ratio f was f=5, number of sub-channels m was m=4, aspect ratio of the sub-channels r was r=0.88, shape of the outlet=1,000 mm×200 mm rectangular and shape of the inlet=200 mm×200 mm square) formed by the suction elbow provided with guide vanes tested in the suction performance test are also shown in FIG. 3.

As shown in FIGS. 2(a) and 3, a substantially uniform distribution of sucked air velocity of 1.5 m/s, and a low pressure loss coefficient of 0.33 were obtained by the suction performance test. The pressure loss coefficient of the tested suction elbow provided with guide vanes was one of the smallests among suction elbows provided with guide vanes.

As shown in FIG. 3, the pressure loss coefficient was 0.70 when the tested suction elbow was used as a blowout elbow. It can be concluded from hydrodynamic principles that the pressure loss by a vortex flow occurs not in a reduction flow but in an expansion flow because a vortex flow is generated not in a reduction flow but in an expansion flow. Considering this fact, it seems reasonable that the pressure loss coefficient of the tested suction elbow provided with guide vanes was about ½ of that of the blowout elbow formed by the tested suction elbow.

The present inventor earlier proposed using the present suction elbow provided with guide vanes as a blowout elbow, in Japanese Patent Laid-Open Publication 7-269524.

(3) Relation Between the Reference Aspect Ratio of a Suction Elbow Provided with Guide Vanes and the Reference Aspect Ratio of a Blowout Elbow Provided with Guide Vanes The inlet angle $\theta_i$ of fluid sucked into a suction elbow provided with guide vanes (See FIG. 2(a)) varies with the aspect ratio r of the sub-channels, which is equal to the aspect ratio of circumscribing rectangles of circular arcs of guide vanes. The relation between the inlet angle $\theta_i$ and the aspect ratio r of the sub-channels can be experimentally obtained. The aspect ratio r of the sub-channels when the inlet angle $\theta_i$ is 90° and the fluid is vertically sucked into the inlet of the elbow is hereinafter called the reference aspect ratio $r_0$. The reference aspect ratio $r_0$ is a function of reduction ratio f. In a suction elbow in accordance with the present invention, the reference aspect ratio r is $r_0$=0.88 when the reduction ratio f is f=5.

In the same way as in the suction elbow provided with guide vanes, the outlet angle $\theta_o$ of a blowout elbow provided with guide vanes (See FIG. 2(a)) varies with the aspect ratio r of the sub-channels, which is equal to the aspect ratio of circumscribing rectangles of circular arcs of guide vanes. The relation between the outlet angle $\theta_o$ and the aspect ratio r of the sub-channels can be experimentally obtained. The aspect ratio r of the sub-channels when the outlet angle $\theta_o$ is 90° and the fluid vertically discharges from the outlet of the elbow is hereinafter called the reference aspect ratio $r_0$. The reference aspect ratio $r_0$ is a function of expansion ratio f.

It was experimentally made clear that the reference aspect ratio $r_0$ of a suction elbow provided with guide vanes in accordance with the present invention is equal to the reference aspect ratio $r_0$ of a blowout elbow formed by the suction elbow when the reduction ratio f of the suction elbow is equal to the expansion ratio f of the blowout elbow. Thus, the suction elbow provided with guide vanes in accordance with the present invention can be used as a reversible elbow enabling the vertical suction and the vertical discharge when the aspect ratio r of the sub-channels is equal to the reference aspect ratio $r_0$.

(4) Limit Value of the Reduction Ratio f

The velocity of sucked fluid near the outer side wall of the elbow decreases to degrade the uniformity of the velocity of sucked fluid when the reduction ratio f increases beyond 5. Thus, the practical upper limit of the reduction ratio f is f=5. For the same reason, the practical upper limit of the expansion ratio f is f=5 when the suction elbow provided with guide vanes in accordance with the present invention is used as a blowout elbow provided with guide vanes.

(5) Appropriate Value of Number m of the Sub-channels

According to the test results, the appropriate range of value m is 2 to 5.

When a suction elbow provided with guide vanes is designed under a condition of m=1 based on the formulas ① to ③, there is obtained a suction elbow wherein the inner side wall radius is $R_0$, the outer side wall radius is $R_1$ and no guide vane but only a single channel is disposed. The inventor experimentally confirmed that the above described single channel suction elbow with no guide vane can achieve substantially uniform distribution of sucked fluid velocity. It seems that the flow resistance increases near the inner side wall because the inner side wall radius $R_0$ is fairly small when m=1 and the velocity distribution of a free vortex flow and the flow resistance distribution cancel each other.

[II] Preferred Embodiments (1) First Embodiment

Figure 4:
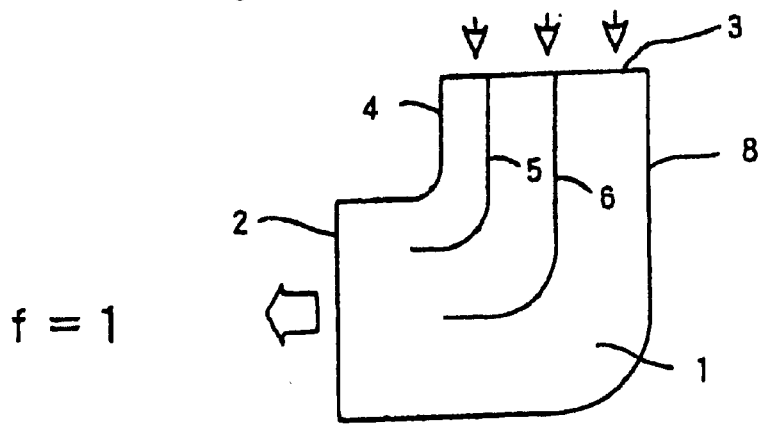
FIGS. 4($a$) to 4($c$) are structural views of suction elbows provided with guide vanes in accordance with the first embodiment of the present invention.
Figure 4:
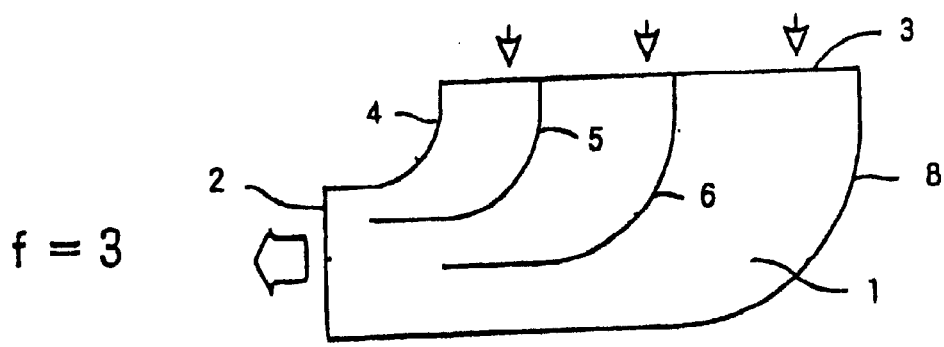
Figure 4:
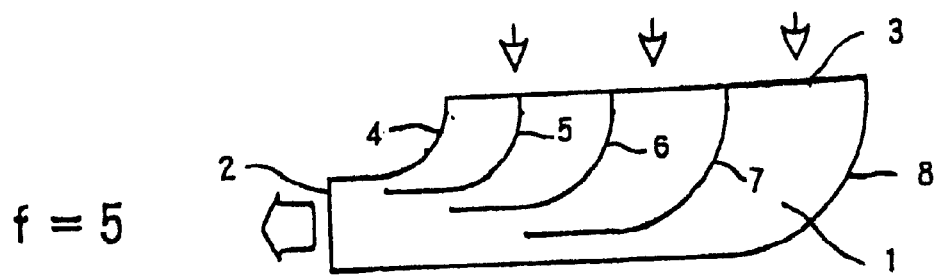

FIG. 4(a) shows a side sectional view of a suction elbow in accordance with an embodiment of the present invention, wherein the reduction ratio f is f=1 and the number m of the sub-channels is m=3. FIG. 4(b) shows a side sectional view of a suction elbow in accordance with an embodiment of the present invention, wherein the reduction ratio f is f=3 and the number m of the sub-channels is m=3. FIG. 4(c) shows a side sectional view of a suction elbow in accordance with an embodiment of the present invention, wherein the reduction ratio f is f=5 and the number m of the sub-channels is m=4. In the Figures, reference numeral 1 indicates the body of the elbow, reference numeral 2 indicates the outlet of the elbow, reference numeral 3 indicates the inlet of the elbow, reference numeral 4 indicates the inner side wall of the elbow, reference numerals 5, 6 and 7 indicate the guide vanes, and reference numeral 8 indicates the outer side wall. The outlet 2 and the inlet 3 have rectangular or circular cross sections. An elbow through which pressurized fluid passes desirably has a circular cross section.

(2) Second Embodiment

FIG. 5(a) shows a side sectional view of a noise absorbing normal suction elbow 9 in accordance with an embodiment of the present invention, wherein the reduction ratio f is f=1 and the number m of the sub-channels is m=3. FIG. 5(b) shows a side sectional view of a noise absorbing reduction suction elbow 15 in accordance with an embodiment of the present invention, wherein the reduction ratio f is f=5 and the number m of the sub-channels is m=4. Noise absorbing members are adhered to the inner surface of outer side walls 14 and 20, the inner surface of the inner side walls 12 and 18, and the both surfaces of guide vanes 13 and 19. In the Figures, reference numerals 10 and 16 indicate elbow inlets and reference numerals 11 and 17 indicate elbow outlets.

An elbow has essentially noise absorbing effect because acoustic wave cannot pass straight through a channel in the elbow bent at right angles. In the noise absorbing suction elbows 9 and 15, a large noise absorbing effect can be obtained because the guide vanes 13 and 19 divide the elbows into sub-channels to increase the wall area. An especially large noise absorbing effect can be obtained in the noise absorbing suction elbow 15, wherein the reduction ratio f is large and the wall area is large. The noise absorbing effect further increases when noise absorbing members are adhered to the surfaces of the walls.

(3) Third Embodiment

FIGS. 6(a) and 6(b) show an L-shaped suction elbow provided with guide vanes 21 in accordance with an embodiment of the present invention. The elbow 21 has a first suction elbow provided with guide vanes 22. The first suction elbow 22 has an inlet 23 and an outlet 24. The elbow 21 has a second suction elbow provided with guide vanes 25. The second suction elbow 25 has an inlet 26 and an outlet 27. The first suction elbow 22 and the second suction elbow 25 are connected together in tandem. The inlet 26 of the second suction elbow 25 abuts the outlet 24 of the first suction elbow 22. The outlet 27 of the second suction elbow 25 is directed at right angles to the inlet 23 of the first suction elbow 22. Reduction ratio f of the first suction elbow 22 and the second suction elbow 25 is f=5. Thus, the area ratio of the inlet 23 to the outlet 27 of the L-shaped suction elbow 21 provided with guide vanes is 25.

As shown in FIG. 3, pressure loss coefficient of the suction elbow in accordance with the present invention is small. Thus, pressure loss of the L-shaped suction elbow provided with guide vanes 21 is small. The L-shaped suction elbow provided with guide vanes 21 forms a suction surface achieving uniform distribution of sucked fluid velocity, small pressure loss and high reduction ratio. Thus, the L-shaped suction elbow 21 is suitable to be used in drying apparatuses, clean rooms, heat exchangers, suction apparatuses thereby forming a suction floor or a suction wall.

(4) Fourth Embodiment

Figure 7A:
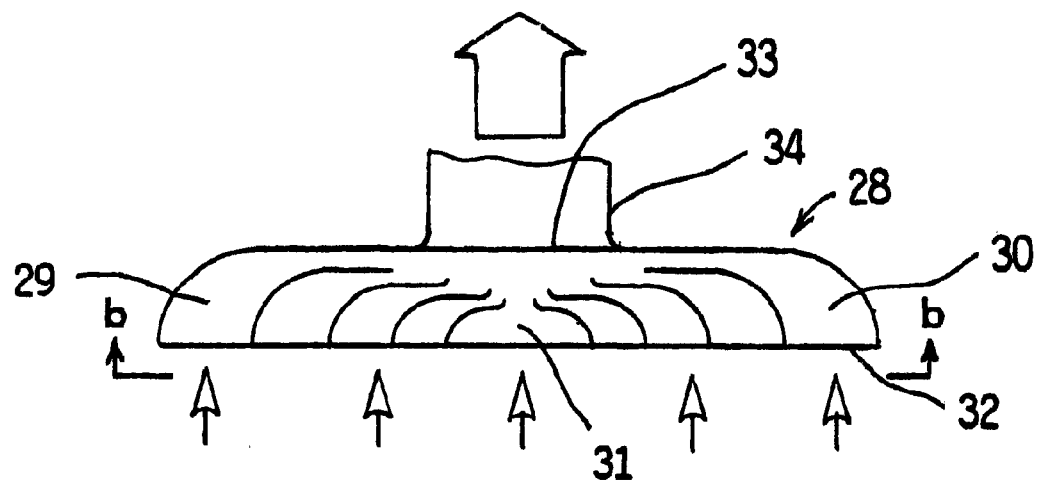
FIGS. 7($a$) and 7($b$) are structural views of a parallel suction elbow provided with guide vanes in accordance with the fourth embodiment of the present invention.
Figure 7B:
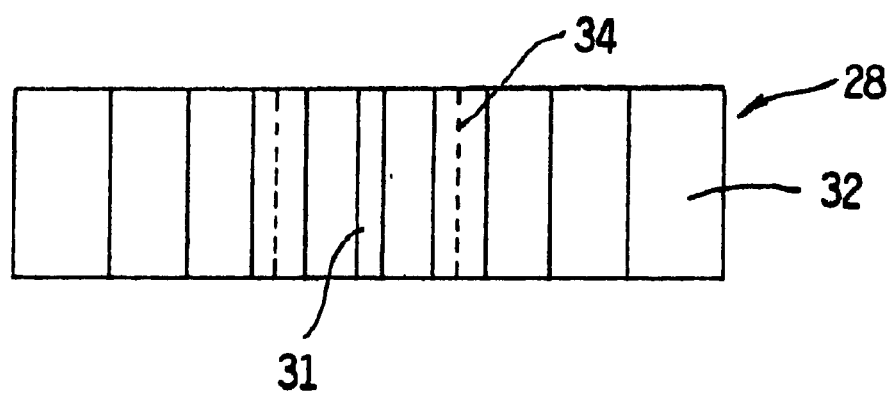

FIGS. 7(a) and 7(b) show a parallel suction elbow provided with guide vanes 28 in accordance with an embodiment of the present invention. The parallel suction elbow 28 has a pair of suction elbows provided with guide vanes 29 and 30. The suction elbows 29 and 30 are of the same size and mirror-symmetrically disposed. The inlet of the elbow 29 and the inlet of the elbow 30 are disposed flush with each other and connected to each other to form an inlet 32 provided with a central inlet 31. The outlet of the elbow 29 and the outlet of the elbow 30 are connected to each other to form an outlet 33. A duct 34 is connected to the outlet 33.

The parallel suction elbow provided with guide vanes 28 is useful as a thin suction elbow provided with guide vanes with large inlet area.

(5) Fifth Embodiment

Figure 8:
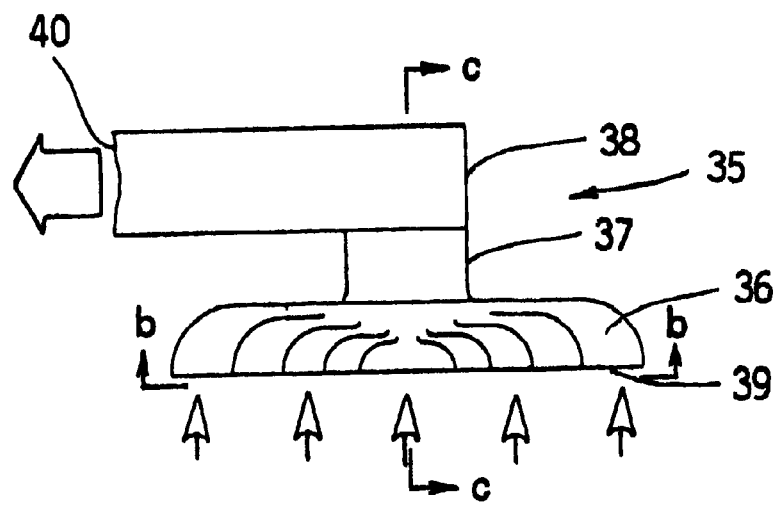
FIGS. 8($a$) to 8($c$) are structural views of a duplex parallel suction elbow provided with guide vanes in accordance with the fifth embodiment of the present invention.
Figure 8:
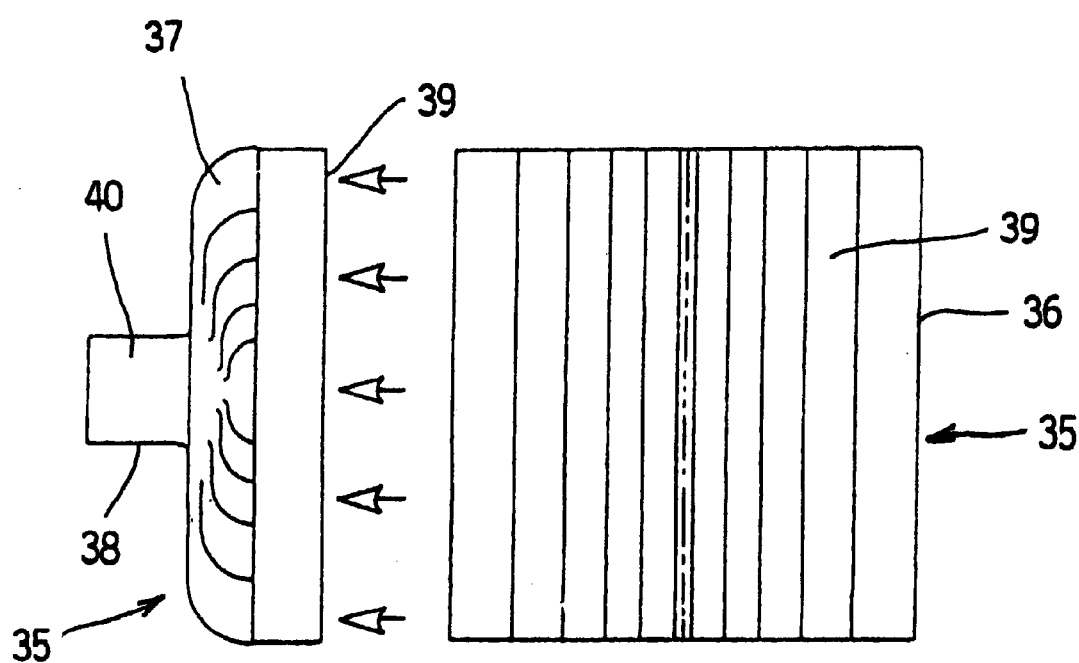

FIGS. 8(a) to 8(c) show a duplex parallel suction elbow provided with guide vanes 35 in accordance with an embodiment of the present invention. The elbow 35 has a first parallel suction elbow provided with guide vanes 36, a second parallel suction elbow provided with guide vanes 37 connected to the rear surface of the first parallel suction elbow provided with guide vanes 36, and a duct 38 connected to the rear surface of the second parallel suction elbow 37. The inlet of the second parallel suction elbow 37 is connected to the outlet of the first parallel suction elbow 36.

The duplex parallel suction elbow 35 is suitable for forming a suction wall of a large size structure because the area ratio of the inlet 39 to the outlet 40 or the reduction ratio f is large.

(6) Sixth Embodiment

Figure 9:
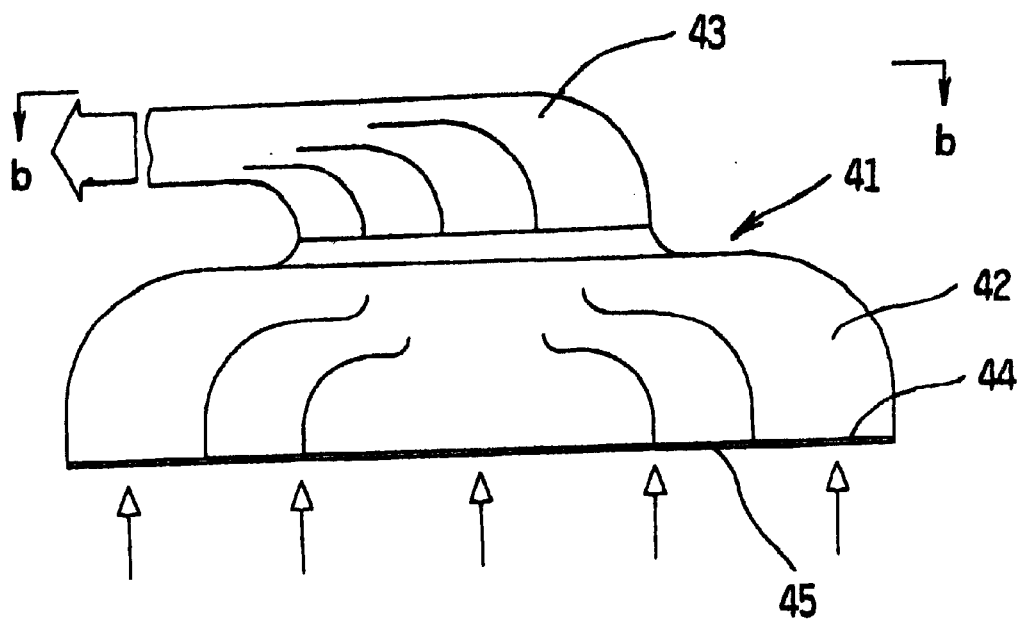
FIGS. 9($a$) and 9($b$) are structural views of a parallel elbow hood in accordance with the sixth embodiment of the the present invention comprising a parallel suction elbow provided with guide vanes in accordance with the present invention and a suction elbow provided with guide vanes in accordance with the present invention which are assembled with each other.
Figure 9:
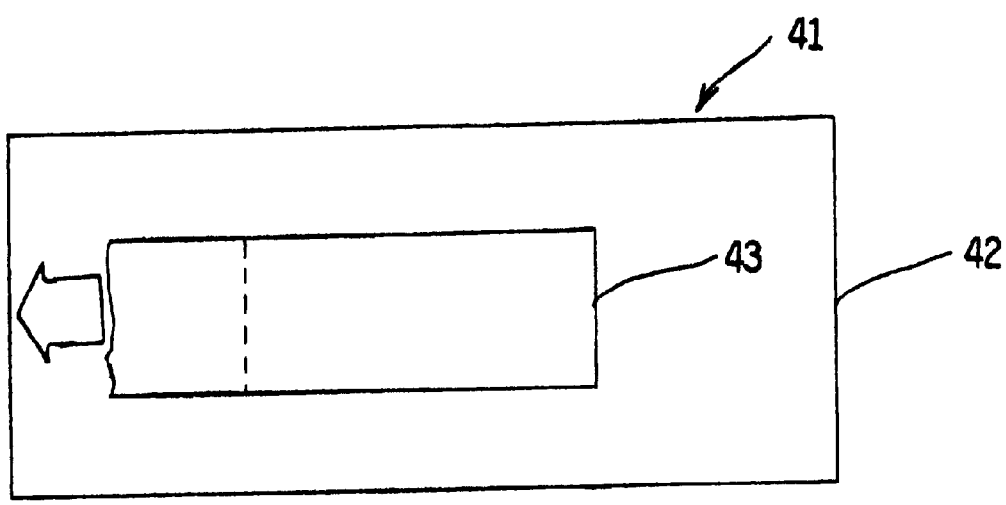

FIGS. 9(a) and 9(b) show a parallel elbow hood 41 in accordance with an embodiment of the the present invention. The parallel elbow hood 41 has a first parallel suction elbow provided with guide vanes 42 and a second suction elbow provided with guide vanes 43 connected to the rear surface of the first parallel suction elbow provided with guide vanes 42. A filter 45 is connected to the inlet 44 of the elbow hood 41.

Conventional exhaust hoods can not achieve high capturing coefficient of exhaust air because the sucked air velocity distribution at the inlet of the hood is ununiform. Specifically, the sucked air velocity is high near the central portion of the inlet and low near the peripheral portion of the inlet and the exhaust air is hardly captured near the peripheral portion of the inlet. The parallel elbow hood 41 can achieve a high capturing coefficient of exhaust air because the sucked air velocity distribution at the inlet 44 is uniform. Grease component is removed from the oily smoke by the filter 45. The parallel elbow hood 41 can be maintained easily because its structure is simple.

(7) Seventh Embodiment

Figure 10:
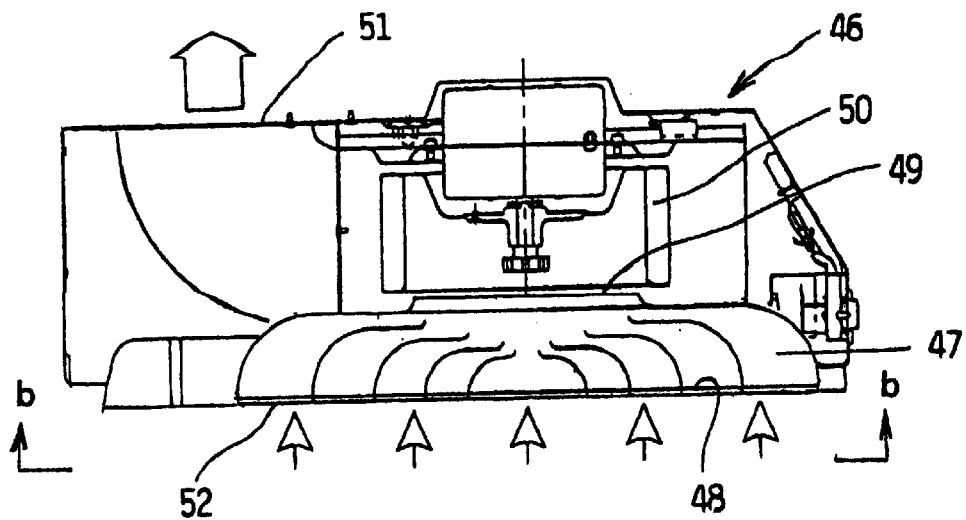
FIGS. 10($a$) and 10($b$) are structural views of a range hood for domestic use in accordance with the seventh embodiment of the present invention comprising a parallel suction elbow provided with guide vanes in accordance with the present invention.
Figure 10:
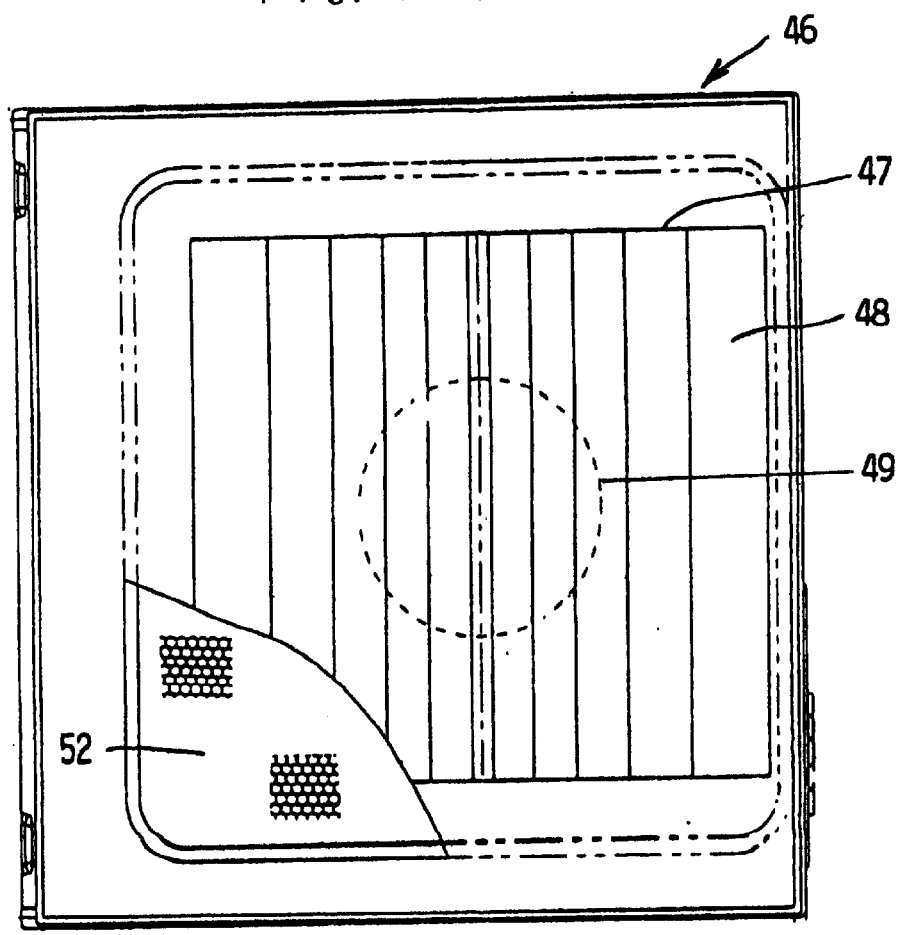

FIGS. 10(a) and 10(b) show a range hood for domestic use 46 provided with a parallel suction elbow provided with guide vanes in accordance with an embodiment of the present invention. The range hood 46 has a parallel suction elbow provided with guide vanes 47. The parallel suction elbow provided with guide vanes 47 has an inlet 48 and a circular outlet 49. The elbow inlet 48 forms the inlet of the range hood. A centrifugal fan 50 is disposed opposite the elbow outlet 49. A range hood outlet 51 is disposed to the side of the centrifugal fan 50. The elbow inlet 48 is provided with a filter 52.

The range hood 46 can achieve a high capturing coefficient of exhaust air because the sucked air velocity distribution at the inlet 48 of the parallel suction elbow provided with guide vanes 47 is uniform. Grease component is removed from the oily smoke by the filter 52. The range hood 46 can be maintained easily because the structure of the parallel suction elbow provided with guide vanes 47 is simple. A range hood 46 wherein the size of the inlet 48 of the parallel suction elbow provided with guide vanes 47 was 400 mm×400 mm and the diameter of the inlet of the centrifugal fan 50 was 200 mm was tested for performance. The capturing coefficient of exhaust air of the range hood 46 was 100%

(8) Eighth Embodiment

FIGS. 11(a) to 11(c) show an elbow type range hood 53 provided with a suction elbow provided with guide vanes in accordance with an embodiment of the present invention. The range hood 53 has a suction elbow provided with guide vanes 54 wherein number of sub-channels m is m=2. The suction elbow provided with guide vanes 54 has an inlet 55 and an outlet 56. The elbow inlet 55 forms the inlet of the range hood. A centrifugal fan 57 is disposed opposite the elbow outlet 56. A range hood outlet 58 is disposed to the side of the centrifugal fan 57. The elbow inlet 55 is provided with a filter 59.

The range hood 53 can achieve high capturing coefficient of exhaust air because the sucked air velocity distribution at the inlet 55 of the suction elbow provided with guide vanes 54 is uniform. Grease component is removed from the oily smoke by the filter 59. The range hood 53 can be maintained easily because the structure of the suction elbow provided with guide vanes 54 is'simple.

(9) Ninth Embodiment

Figures 12A, 12B:
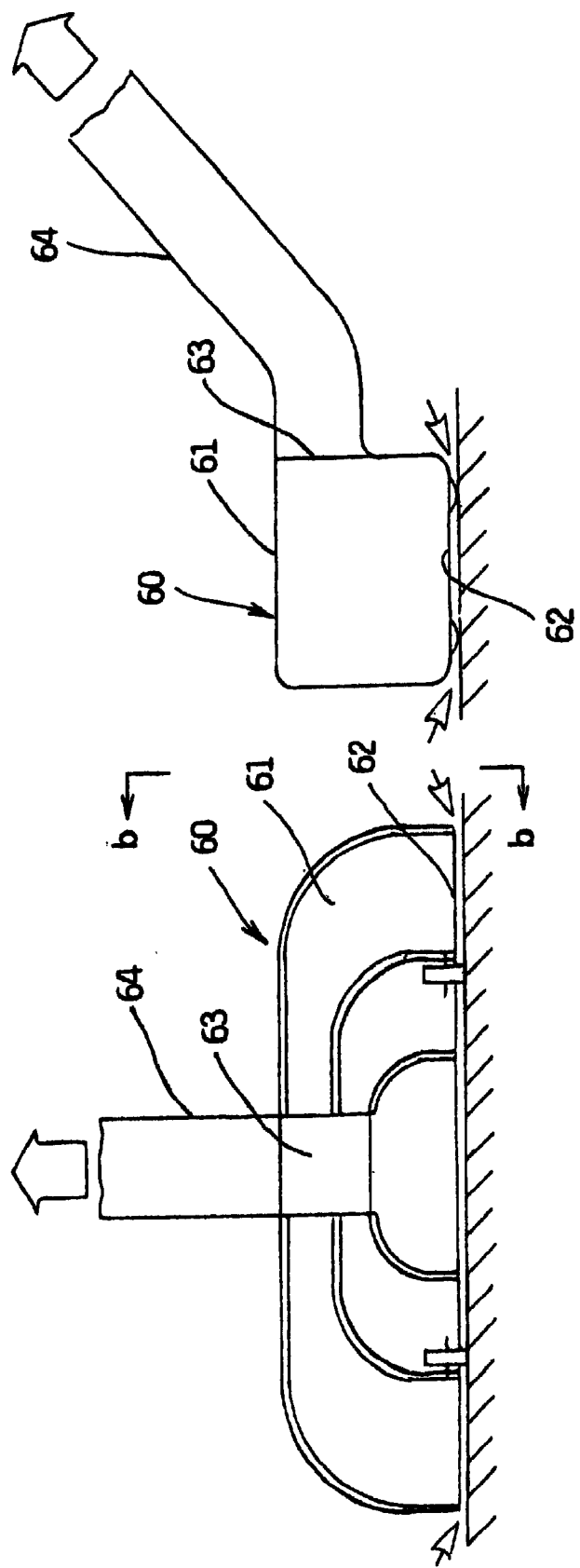
FIGS. 12($a$) and 12($b$) are structural views of the suction nozzle of an electric cleaner in accordance with the ninth embodiment of the present invention comprising a parallel suction elbow provided with guide vanes in accordance with the present invention.

FIGS. 12(a) and 12(b) show a suction nozzle 60 of an electric cleaner provided with a parallel suction elbow provided with guide vanes in accordance with an embodiment of the present invention. The suction nozzle 60 has a parallel suction elbow provided with guide vanes 61. The parallel suction elbow provided with guide vanes 61 has an inlet 62 and an outlet 63. An exhaust pipe 64 is connected to the outlet 63.

The suction nozzle 60 can capture dust over whole area of the inlet 62 because the sucked air velocity distribution at the inlet 62 of the suction elbow provided with guide vanes 61 is uniform. The conventional suction nozzle of an electric cleaner can capture dust only at the area near the connecting part to the exhaust pipe.

(10) Tenth Embodiment

FIGS. 13(a) and 13(b) show a suction apparatus 65 provided with a suction elbow provided with guide vanes in accordance with an embodiment of the present invention. The suction apparatus 65 has a suction elbow provided with guide vanes 66. The suction elbow provided with guide vanes 66 has an inlet 67 and an outlet 68. A duct 69 and a fan 70 are connected to the outlet 68. The area ratio of the inlet 67 to the outlet 68 is 10.

The suction apparatus 65 can capture exhaust air and dust over whole area of the inlet 67 because the sucked air velocity distribution at the inlet 67 of the suction elbow provided with guide vanes 66 is uniform. The captured exhaust air and dust are discharged through the duct 69. An ordinary ventilating fan with low output pressure and low electric consumption can be used as the fan 70 because pressure loss of the suction elbow provided with guide vanes 66 is low. The suction apparatus 65 is useful as a suction apparatus with small electric consumption and large air flow rate for installation in factories, bus terminals, etc. to improve the environmental conditions at the place where it is installed.

(11) Eleventh Embodiment

Figure 14:
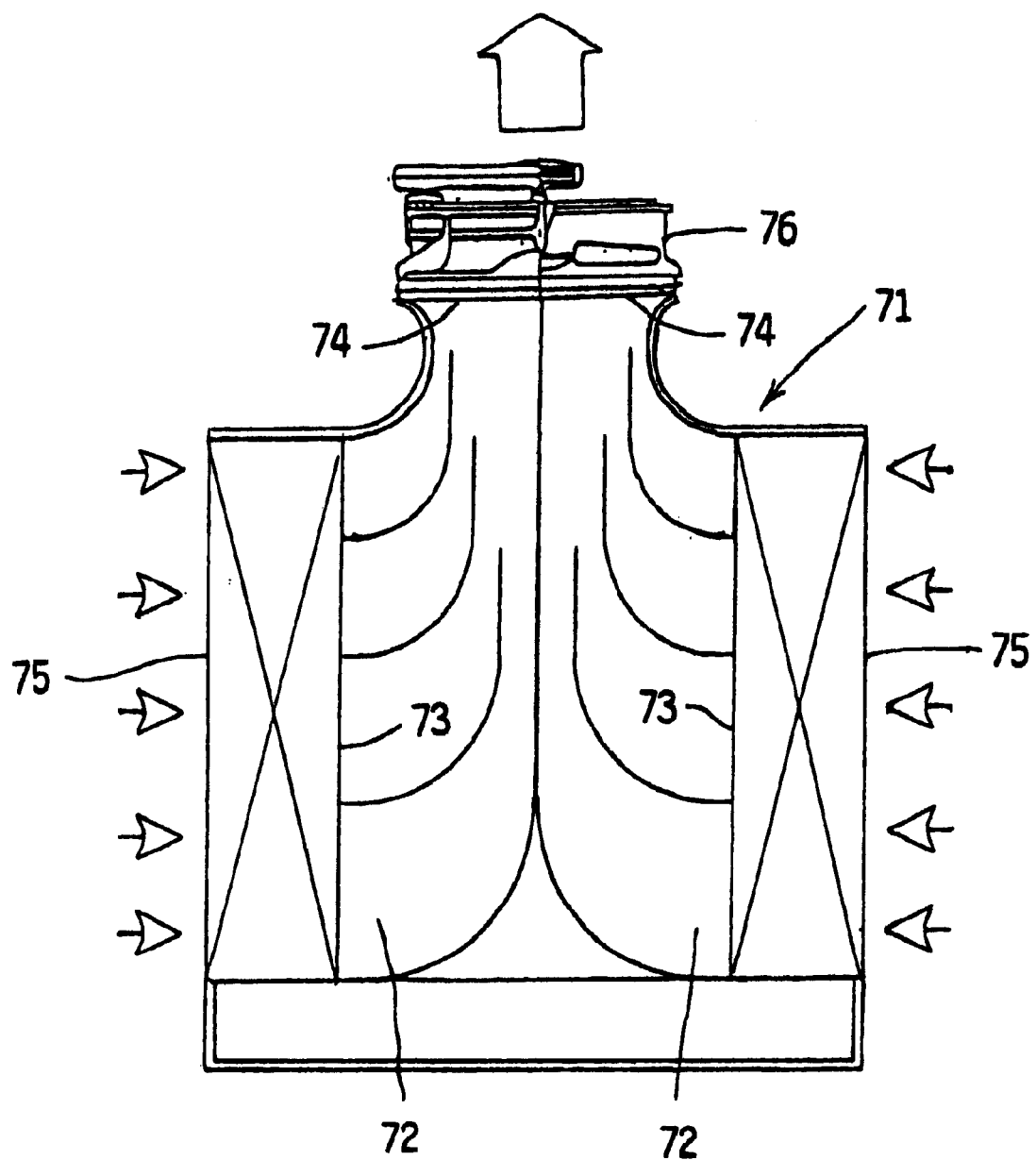
FIG. 14 is a side sectional view of a cooling tower in accordance with the eleventh embodiment of the present invention comprising suction elbows provided with guide vanes in accordance with the present invention.

FIG. 14 shows a cooling tower 71 having suction elbows provided with guide vanes in accordance with an embodiment of the present invention. The cooling tower 71 has a pair of suction elbows provided with guide vanes 72, 72 disposed back to back. The suction elbow provided with guide vanes 72 has an inlet 73 and an outlet 74. A filling layer 75 for scattering cooling water is disposed opposite the inlet 73. A fan 76 is disposed opposite the outlet 74.

Cooling water passing through the filling layer 75 is cooled uniformly because the sucked air velocity distribution at the inlet 73 of the suction elbow provided with guide vanes 72 is uniform and the flow velocity distribution of cooling air passing through the filling layer 75 is uniform. Thus, the cooling tower 71 has a high cooling capability. Conventional cooling towers have only the filling layer 75 and the fan 76. In the conventional cooling towers, cooling water passing through the filling layer 75 is not cooled uniformly because the flow velocity of cooling air passing through the portion of the filling layer 75 near the fan 76 is high and the flow velocity of cooling air passing through portions of the filling layer 75 apart from the fan 76 is low and thus the velocity distribution of the cooling air passing through the filling layer 75 is ununiform. Thus, the cooling capacity of conventional cooling towers is not high. The cooling tower 71 is very quiet because the suction elbow provided with guide vanes 72 has a noise absorbing effect. When the suction elbow provided with guide vanes 72 is made of plastic, the production cost and the running cost of the cooling tower 71 can be reduced.

(12) Twelfth Embodiment

Figure 15:
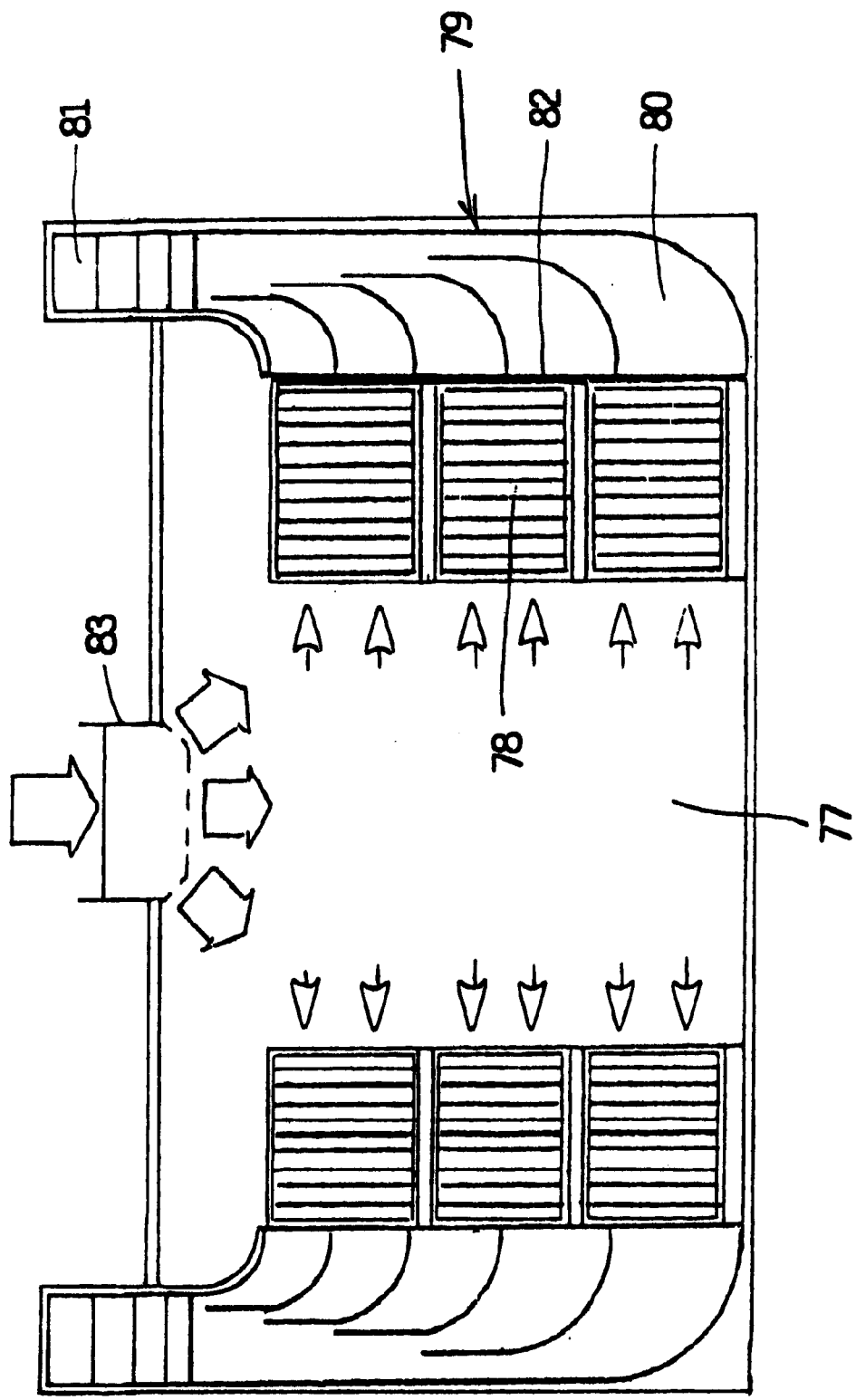
FIG. 15 is a side sectional view of an animal rearing chamber in accordance with the twelfth embodiment of the present invention wherein L-shaped suction elbows provided with guide vanes in accordance with the present invention are used as inlets of rearing cages.

FIG. 15 shows an animal rearing chamber 77 having L-shaped suction elbows provided with guide vanes in accordance with an embodiment of the present invention. Animal rearing cages 78 are disposed in the animal rearing chamber 77. L-shaped suction elbows provided with guide vanes 79 are disposed at the side walls of the animal rearing chamber behind the animal rearing cages 78. Each L-shaped suction elbow provided with guide vanes 79 has a first suction elbow provided with guide vanes 80 and a second suction elbow provided with guide vanes 81. The inlets 82 of the L-shaped suction elbows provided with guide vanes 79 oppose the rear sides of the animal rearing cages 78. A diffusion type air discharging port 83 is disposed on the ceiling of the animal rearing chamber 77.

Sucked air velocity distribution is uniform and the sucked air inlet angle is 90° at the inlets 82 of the L-shaped suction elbows provided with guide vanes 79. Thus, the air supplied to the animal rearing chamber 77 from the diffusion type air discharging port 83 forms horizontal air flows with uniform velocity distribution, passes through the animal rearing cages 78, flows into the inlets 82 of the L-shaped suction elbows provided with guide vanes 79 and discharges from the animal rearing chamber 77. Since stagnation and/or circulation of the air in the animal rearing chamber 77 is therefore prevented, generation of bad smell, bacteria contamination, ununiform distribution of temperature, ununiform distribution of humidity, etc. are prevented.

(13) Thirteenth Embodiment

Figure 16:
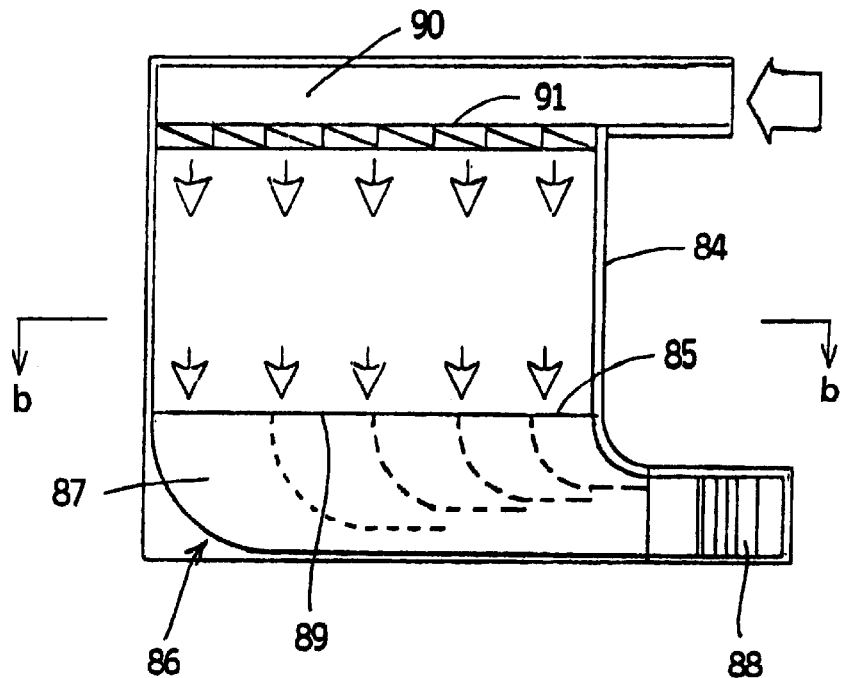
FIGS. 16($a$) and 16($b$) are structural views of a vertical laminar flow type clean room in accordance with the thirteenth embodiment of the present invention wherein an L-shaped suction elbow provided with guide vanes in accordance with the present invention is disposed beneath the suction floor.
Figure 16:
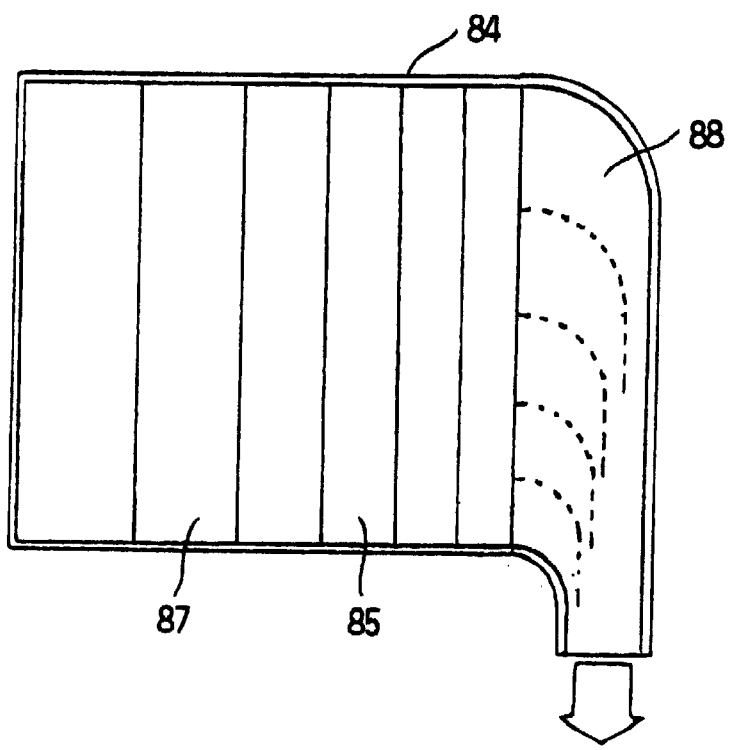

FIGS. 16(a) and 16(b) show a vertical laminar flow type clean room 84 having an L-shaped suction elbow provided with guide vanes in accordance with an embodiment of the present invention. An L-shaped suction elbow provided with guide vanes 86 is disposed beneath the suction floor 85 of the vertical laminar flow type clean room 84. The L-shaped suction elbow provided with guide vanes 86 has a first suction elbow provided with guide vanes 87 and a second suction elbow provided with guide vanes 88. The inlet 89 of the L-shaped suction elbow provided with guide vanes 86 opposes the suction floor 85. An air passage 90 and an air discharging port 91 provided with a HEPA filter are disposed on the ceiling of the vertical laminar flow type clean room 84.

Sucked air velocity distribution is uniform and the sucked air inlet angle is 90° at the inlet 89 of the L-shaped suction elbow provided with guide vanes 86. Thus, the air discharging from the air discharging port 91 forms a vertical air flow with uniform velocity distribution, goes down in the vertical laminar flow type clean room 84, flows into the inlet 89 of the L-shaped suction elbow provided with guide vanes 86 and is discharged from the vertical laminar flow type clean room 84. A chamber with large height conventionally disposed below the floor of the vertical laminar flow type clean room is replaced with the L-shaped suction elbow provided with guide vanes 86 with small height. Thus, the underfloor structure of a vertical laminar flow type clean room is downsized.

(14) Fourteenth Embodiment

Figure 17:
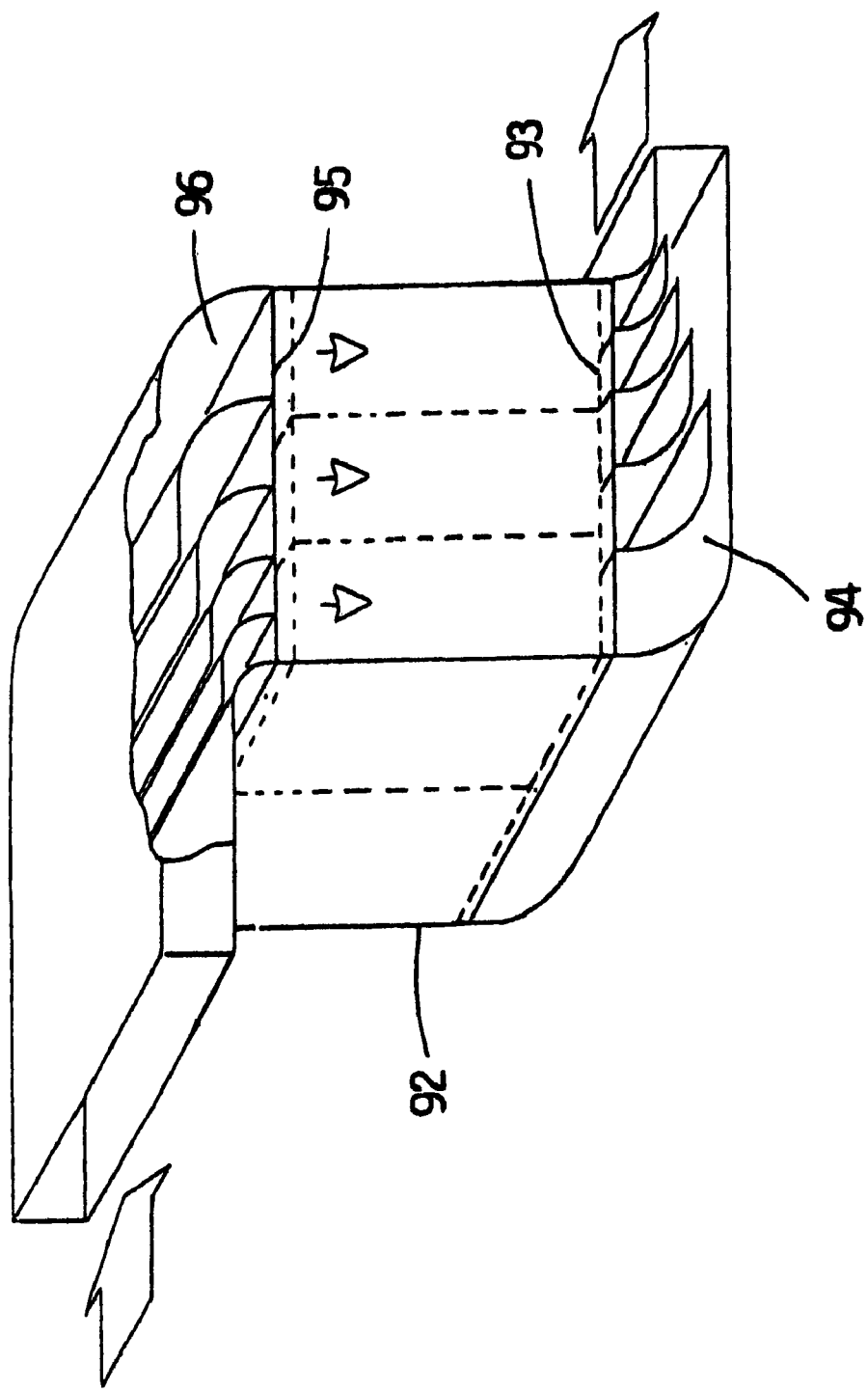
FIG. 17 is a perspective view of a large size reactor in accordance with the fourteenth embodiment of the present invention comprising suction elbows provided with guide vanes in accordance with the present invention.

FIG. 17 shows a large size reactor 92 having a suction elbow provided with guide vanes in accordance with an embodiment of the present invention. A suction elbow provided with guide vanes 94 is disposed at the gas outlet 93 of the large size reactor 92. A blowout elbow provided with guide vanes 96 formed by a suction elbow provided with guide vanes 94 used as a blowout elbow is disposed at the inlet 95 of the large size reactor 92.

In the suction elbow provided with guide vanes 94 and the blowout elbow provided with guide vanes 96, the pressure loss is small, the sucked air velocity distribution and the blown out air velocity distribution are uniform, and the air inlet angle and the air outlet angle are 90°. Thus, a gas flow with uniform velocity distribution is formed in the large size reactor 92 to enhance the performance of the large size reactor 92. It has been hard to form a gas flow with uniform velocity distribution in a large size reactor. A $NO_x$ removal system of a coal boiler, etc. are examples of the large size reactor 92.

(15) Fifteenth Embodiment

Figure 18:
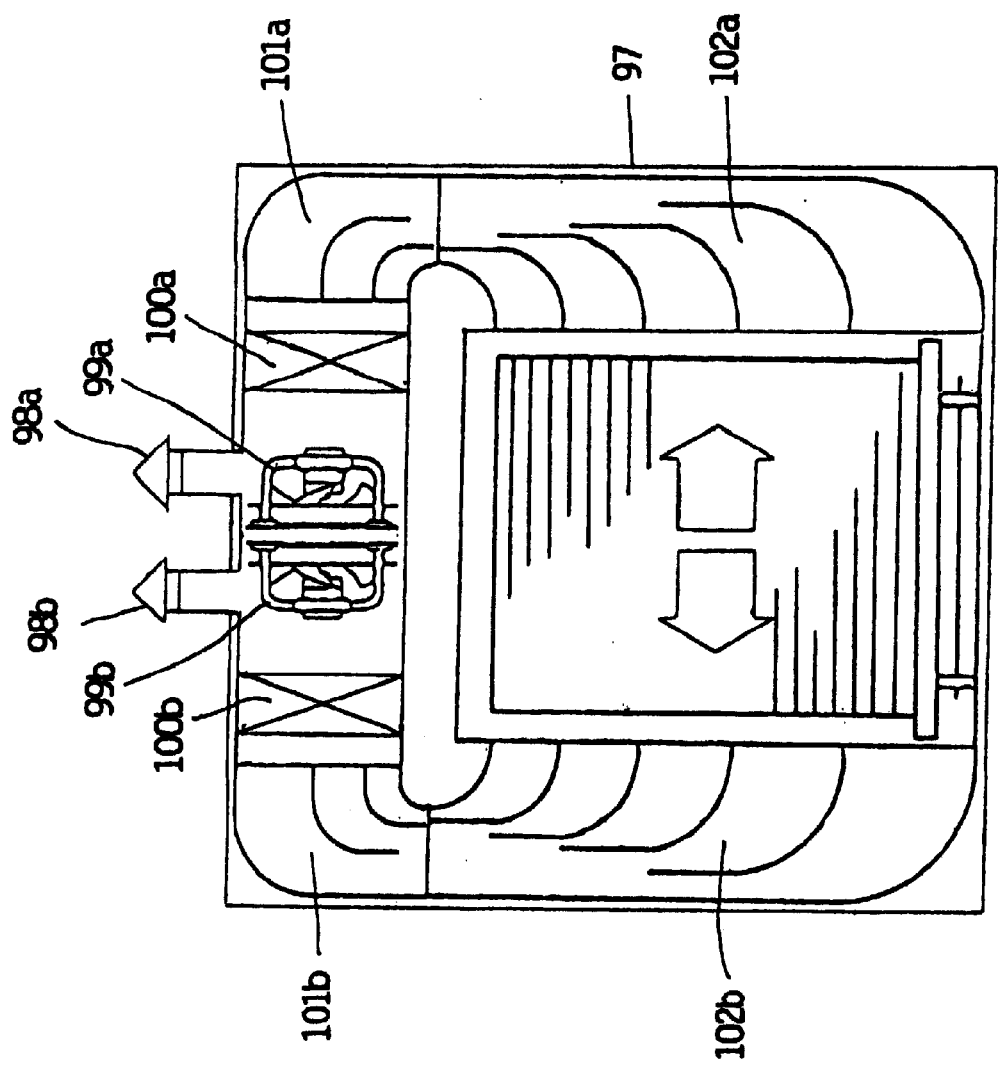
FIG. 18 is a front sectional view of a lumber drying chamber in accordance with the fifteenth embodiment of the present invention comprising suction elbows provided with guide vanes in accordance with the present invention.

FIG. 18 shows a lumber drying chamber 97 having suction elbows provided with guide vanes in accordance with an embodiment of the present invention. A reversible ventilating pipe 98a, a reversible fan 99a, a reversible heat exchanger 100a, and suction elbows provided with guide vanes 101a, 102a are disposed in the lumber drying chamber 97. A reversible ventilating pipe 98b, a reversible fan 99b, a reversible heat exchanger 100b, and suction elbows provided with guide vanes 101b, 102b are disposed in the lumber drying chamber 97 mirror-symmetrically to the reversible ventilating pipe 98a, the reversible fan 99a, the reversible heat exchanger 100a, and the suction elbows provided with guide vanes 101a, 102a.

Reversible flow control of warm air can be carried out in the lumber drying chamber 97 because the suction elbows provided with guide vanes 101a, 102a, 101b, 102b can perform as reversible elbows as explained in section [1](3) of this specification. Thus, generation of ununiformity of drying at the initial stage of the lumber drying process is suppressed.

(16) Sixteenth Embodiment

Figure 19:
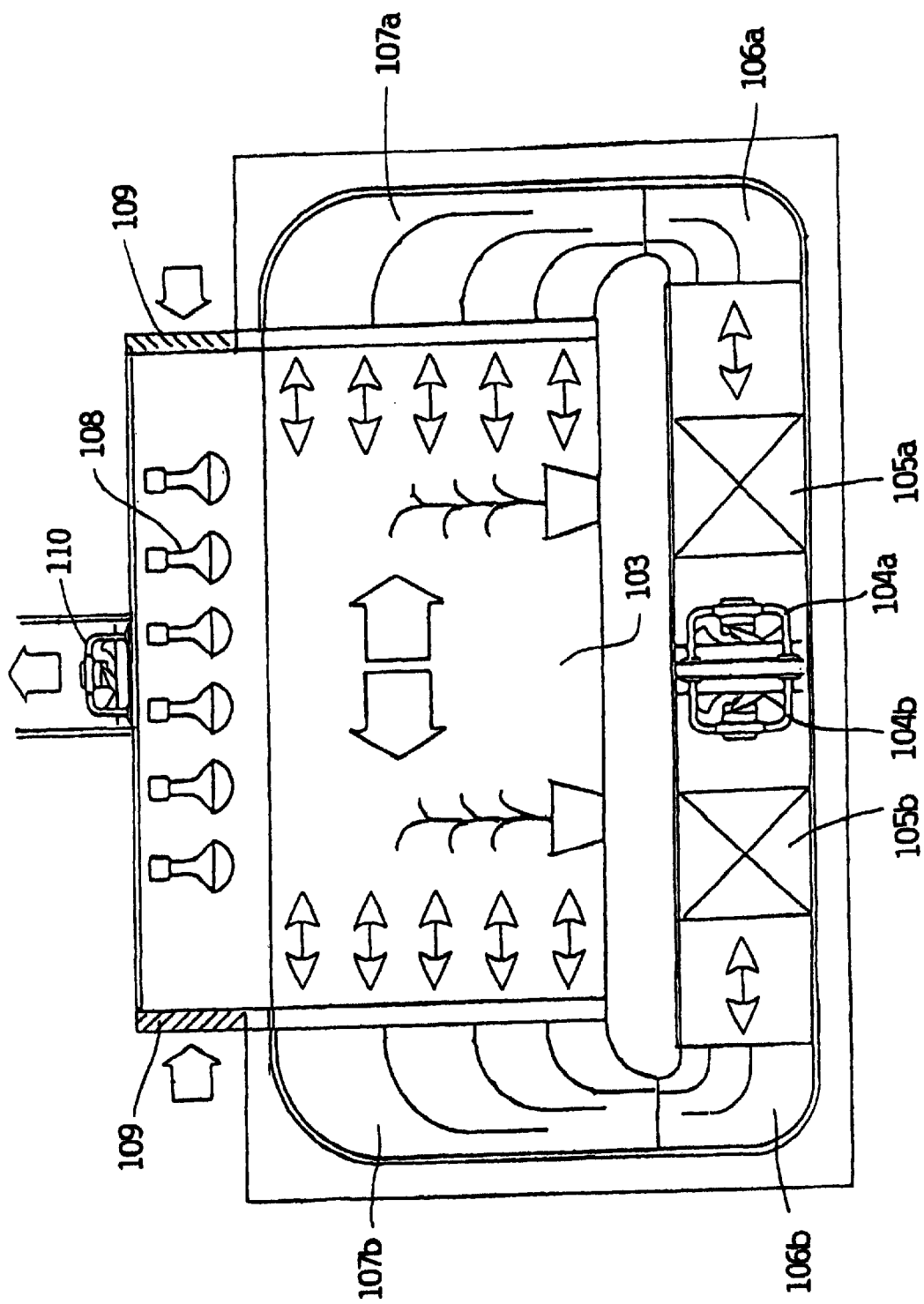
FIG. 19 is a front sectional view of an artificially lighted plant cultivating chamber in accordance with the sixteenth embodiment of the present invention comprising suction elbows provided with guide vanes in accordance with the present invention.

FIG. 19 shows an artificially lighted plant cultivating chamber 103 having suction elbows provided with guide vanes in accordance with an embodiment of the present invention. A reversible fan 104a, a reversible heat exchanger 105a and suction elbows provided with guide vanes 106a, 107a are disposed in the artificially lighted plant cultivating chamber 103. A reversible fan 104b, a reversible heat exchanger 105b and suction elbows provided with guide vanes 106b, 107b are disposed in the artificially lighted plant cultivating chamber 103 mirror-symmetrically to the reversible fan 104a, the reversible heat exchanger 105a and the suction elbows provided with guide vanes 106a, 107a. Lamps 108, external air inlets 109 and an internal air exhaust fan 110 are disposed on the ceiling of the artificially lighted plant cultivating chamber 103.

Reversible flow control of chamber air can be carried out in the artificially lighted plant cultivating chamber 103 because the suction elbows provided with guide vanes 106a, 107a, 106b, 107b can perform as reversible elbows. Thus, plants can be cultivated in good condition in the artificially lighted plant cultivating chamber 103.

(17) Seventeenth Embodiment

Figure 20A:
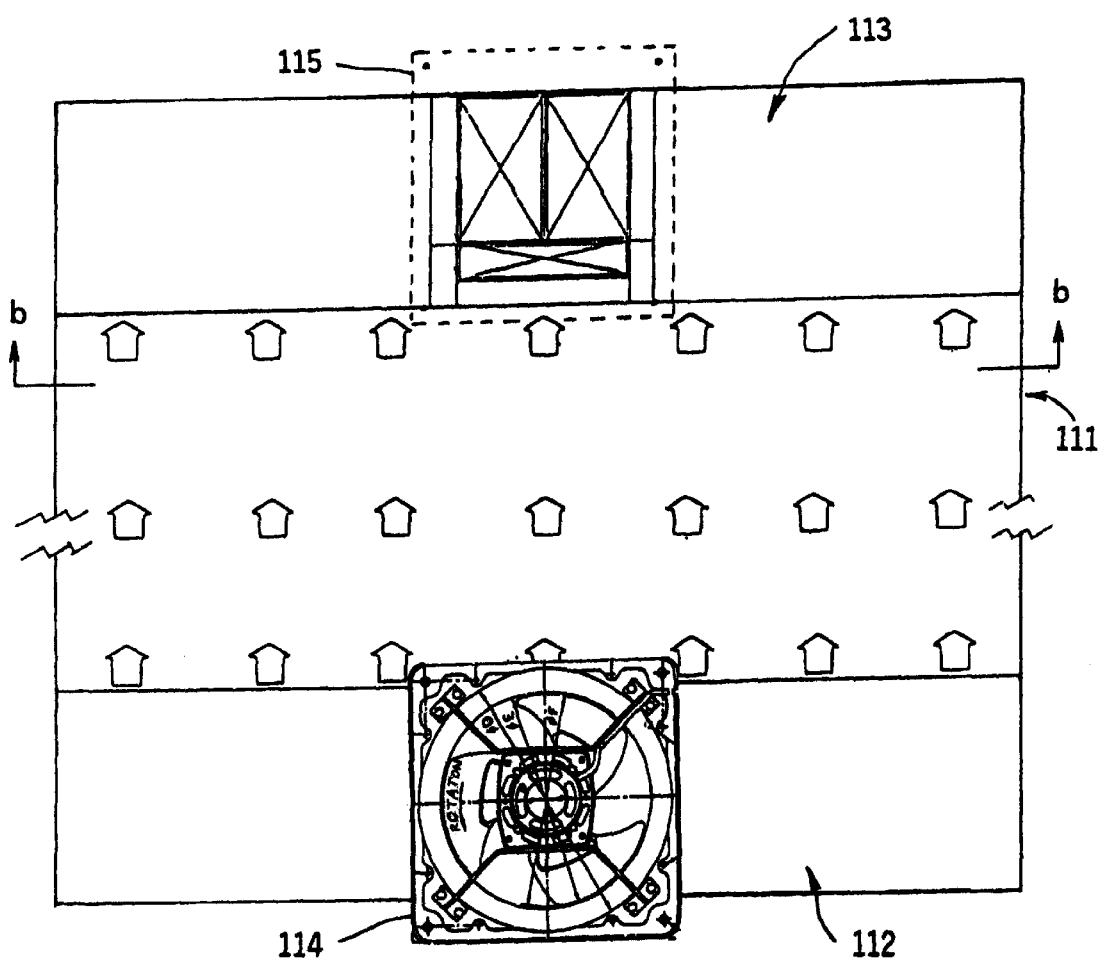
FIGS. 20(a) and 20(b) are structural views of an air shutter apparatus in accordance with the seventeenth embodiment of the present invention comprising suction elbows provided with guide vanes in accordance with the present invention.
Figure 20B:
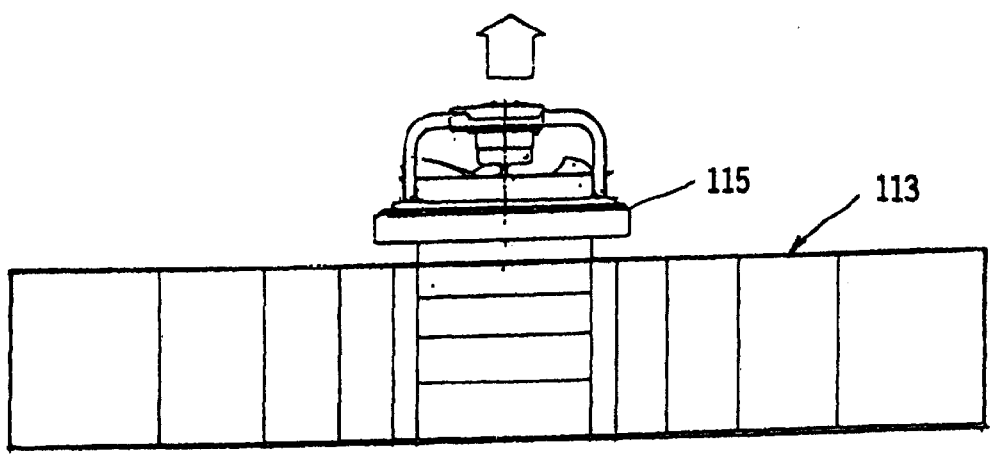

FIGS. 20(a) and 20(b) show an air shutter apparatus 111 having suction elbows provided with guide vanes in accordance with an embodiment of the present invention. In the air shutter apparatus 111, a first T-shaped suction elbow 112 having five suction elbows provided with guide vanes connected to each other in parallel and in tandem and a second T-shaped suction elbow 113 having the same structure as that of the first T-shaped suction elbow 112 are disposed. The first T-shaped suction elbow 112 and the second T-shaped suction elbow 113 are spaced from each other. The inlet of the first T-shaped suction elbow 112 and the inlet of the second T-shaped suction elbow 113 oppose each other. The first T-shaped suction elbow 112 is provided with a fan 114. The second T-shaped suction elbow 113 is provided with a fan 115. The first T-shaped suction elbow 112 is used as a blowout elbow and the second T-shaped suction elbow 113 is used as a suction elbow simultaneously.

Figure 21:
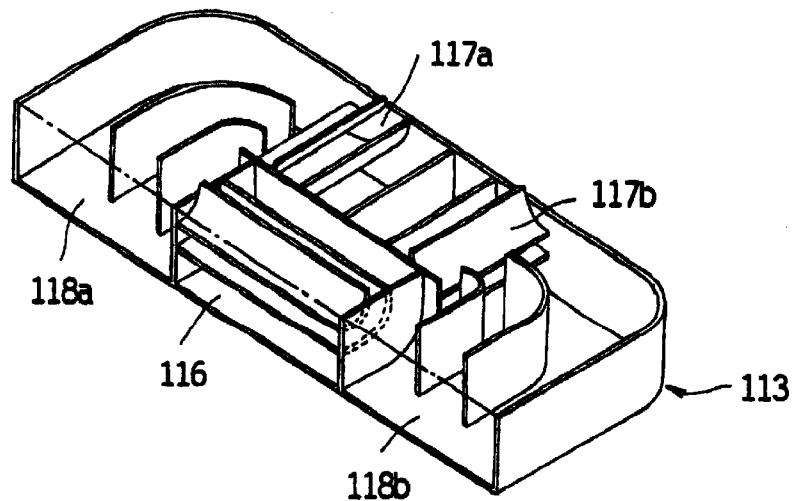
FIGS. 21(a) to 21(c) are structural views of a T-shaped suction elbow that is a component of the air shutter apparatus of FIGS. 20(a) and 20(b).
Figure 21:
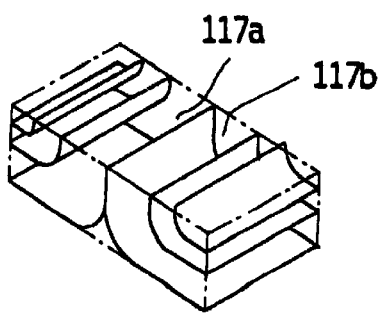
Figure 21:
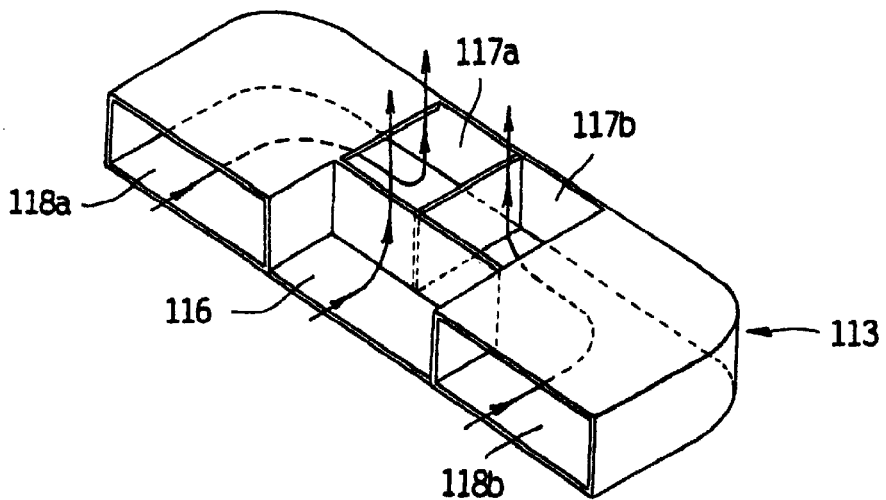

The structure of the second T-shaped suction elbow 113 will be described in detail. As shown in FIGS. 21(a) and 21(b), the second T-shaped suction elbow 113 has a first elbow 116 disposed at the front center, a pair of second elbows 117a, 117b disposed mirror-symmetrically back to back, adjacent the first elbow 116 and to the rear of the first elbow 116 and a pair of third elbows 118a, 118b disposed adjacent the first elbow 116 and the second elbows 117a and 117b. The third elbow 118a is disposed to the left of the first elbow 116 and the second elbow 117a. The third elbow 118b is disposed to the right of the first elbow 116 and the second elbow 117b. The first elbow 116, the second elbows 117a, 117b and the third elbows 118a, 118b are designed in accordance with the aforementioned formulas ①  to ③. The second elbow 117a is connected to the third elbow 118a in tandem. The second elbow 117b is connected to the third elbow 118b in tandem. The first elbow 116 and the third elbows 118a, 118b are disposed in parallel. The first elbow 116 and the second elbow 117a, 117b are connected to the fan 115 shown in FIGS. 20(a) and 20(b) at their upper ends.

When the fan 115 operates, air flows in the first elbow 116 and the third elbows 118a, 118b as indicated by arrows in FIG. 21(c). The air flowing in the first elbow 116 is sucked in the fan 115 directly. The air flowing in the third elbows 118a, 118b passes through the second elbows 117a, 117b and is sucked in the fan 115.

When the fan 114 operates in the first T-shaped suction elbow 112, a part of the air discharging from the fan 114 flows in the second elbows 117a, 117b and discharges through the third elbows 118a, 118b. The reminder of the air flows in the first elbow 116 and discharges from the first elbow 116.

As the inventor disclosed in Japanese Patent Laid-Open Publication 7-269524, the blown out air velocity distribution of the first T-shaped suction elbow 112 is uniform. On the other hand, the sucked air velocity distribution of the second T-shaped suction elbow 113 is uniform as described in the present specification. Thus, a rectified air jet with uniform velocity distribution is formed between the first T-shaped suction elbow 112 and the second T-shaped suction elbow 113 as indicated by void arrows in FIG. 20(*a*). The rectified air jet with uniform velocity distribution is very effective as a fire air shutter or a smoke air shutter.

In the present embodiment, single suction elbows or L-shaped suction elbows as shown in FIGS. 6(*a*), 6(*b*) may be used instead of T-shaped suction elbows.

INDUSTRIAL APPLICABILITY

A suction elbow provided with guide vanes in accordance with the present invention can achieve uniform sucked air velocity distribution and small pressure loss, can operate as a reversible elbow, has a simple structure enabling easy maintenance, and can be applied as a reduction elbow, a normal elbow or an expansion elbow. A plurality of suction elbows provided with guide vanes in accordance with the present invention can be easily assembled in a body to form an L-shaped suction elbow, a T-shaped suction elbow, a parallel suction elbow or a duplex parallel suction elbow. A suction elbow provided with guide vanes in accordance with the present invention can be used in various kinds of apparatuses in new fields.

What is claimed is:

1. A suction elbow, comprising an elbow member having an inlet and an outlet and a source of suction operatively connected to the inlet of the elbow member, the elbow member further comprising an inner side wall having a curved portion defining a first radius, an outer curved portion defining a second radius, at least one guide vane having a curved portion defining a radius and a straight portion connected to the curved portion, wherein the at least one guide vane is disposed to define sub-channels and wherein the suction elbow conforms to the following formulas:

$$p_0 = h / \{[f/(f-r)]^m - 1\} \qquad (1)$$

$$a_n = p_0 [f/(f-r)]^n \qquad (2)$$

$$b_n = a_n / f \qquad (3)$$

wherein $p_0$ is defined to be an overhang length at an inlet of the elbow;

wherein h is defined to be an outlet breadth of the elbow;

wherein f is defined to be a reduction ratio of the elbow and $f = W/h$;

wherein W is defined to be an inlet breadth of the elbow;

wherein m is defined to be a number of sub-channels wherein $m \geq 2$;

wherein $a_n$ is defined to be an inlet breadth of an n-th sub-channel;

wherein $a_0$ is defined to be the first radius of curvature of the inner side wall;

wherein $a_m$ is defined to be the second radius of curvature of the outer side wall;

wherein r is defined to be an aspect ratio of the sub-channels; and wherein $b_n$ is defined to be an outlet breadth of n-th sub-channel.

2. A suction elbow according to claim 1, wherein the reduction ratio f is $f = 1$ and the elbow defines a circular cross section.

3. A suction elbow according to claim 2, further comprising noise absorbing members adhered to an inner surface of the elbow and both surfaces of the guide vanes.

4. An air shutter apparatus comprising a first suction elbow according to claim 1 and a second suction elbow provided with guide vanes having the same structure as that of the first suction elbow, wherein the first suction elbow and the second suction elbow are disposed spaced from each other, the inlet of the first suction elbow and the inlet of the second suction elbow are disposed opposite each other, one of the suction elbows is arranged to be a blowout elbow and the other of the suction elbows is arranged to be a suction elbow.

5. A parallel suction elbow comprising a pair of same sized suction elbows according to claim 1, wherein the pair of suction elbows are mirror-symmetrically disposed, the inlet of one of the suction elbows and the inlet of the other of the suction elbows are disposed flush with and connected to each other, and outlet of one of the suction elbows and the outlet of the other of the suction elbows are connected to each other.

6. A duplex parallel suction elbow comprising a first parallel suction elbow according to claim 5 and a second parallel suction elbow according to claim 5, wherein the first and the second parallel suction elbows are disposed in tandem and cross each other at right angels and the inlet of the second parallel suction elbow is connected to the outlet of the first parallel suction elbow.

7. A suction apparatus comprising a suction elbow according to claim 1 and an exhaust fan connected to the outlet of the suction elbow.

8. A blowout-suction apparatus comprising a pair of same sized suction elbows according to claim 1, wherein the pair of suction elbows are spaced from each other, the inlets of the pair of suction elbows are disposed opposite each other, one of the suction elbows is arranged to be a blowout elbow and the other of the suction elbows is arranged to be a suction elbow.

9. A suction elbow according to claim 1, further comprising noise absorbing members disposed on an inner surface of the elbow and both surfaces of the guide vanes.

10. An L-shaped suction elbow comprising, a first suction elbow according to claim 1 and a second suction elbow according to claim 1, wherein the first suction elbow and the second suction elbow are connected to each other in tandem the inlet of the second suction elbow disposed to abut the outlet of the first suction elbow, and the outlet of the second suction elbow is directed at right angles to the inlet of the first suction elbow.

11. A suction elbow having a single channel, comprising an elbow member having an inlet and an outlet and a source of suction operatively connected to the inlet of the elbow member, the elbow member further comprising an inner side wall having a curved portion defining a first radius, an outer curved portion defining a second radius, said elbow conforming to the following formulas:

$$p_0 = h / \{[f/(f-r)]^m - 1\} \qquad (1)$$

$$a_n = p_0 [f/(f-r)]^n \qquad (2)$$

$$b_n = a_n / f \qquad (3)$$

wherein $p_0$ is defined to be an overhang length at an inlet of the elbow;

wherein h is defined to be an outlet breadth of the elbow;

wherein f is defined to be a reduction ratio of the elbow and f=W/h;

wherein W is defined to be an inlet breadth of the elbow;

wherein h6 m=1;

wherein $a_n$ is defined to be an inlet breadth of the channel;

wherein $a_0$ is defined to be the first radius of curvature of the inner side wall;

wherein $a_m$ is defined to be the second radius of curvature of the outer side wall;

wherein r is defined to be an aspect ratio of the channel; and wherein $b_n$ is defined to be an outlet breadth of the channel.

* * * * *